United States Patent
Yan

(10) Patent No.: US 12,293,095 B2
(45) Date of Patent: May 6, 2025

(54) STORAGE DEVICE AND DATA ACCESS METHOD THEREOF

(71) Applicant: SAMSUNG ELECTRONICS CO., LTD., Suwon-si (KR)

(72) Inventor: Hao Yan, Xi'an (CN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/517,307

(22) Filed: Nov. 22, 2023

(65) Prior Publication Data
US 2025/0068343 A1    Feb. 27, 2025

(30) Foreign Application Priority Data

Aug. 24, 2023   (CN) .......................... 202311075033.8

(51) Int. Cl.
*G06F 3/06* (2006.01)

(52) U.S. Cl.
CPC .......... *G06F 3/0631* (2013.01); *G06F 3/0604* (2013.01); *G06F 3/0634* (2013.01); *G06F 3/0659* (2013.01); *G06F 3/0688* (2013.01)

(58) Field of Classification Search
CPC .... G06F 3/0631; G06F 3/0604; G06F 3/0634; G06F 3/0659; G06F 3/0688
See application file for complete search history.

(56) References Cited

U.S. PATENT DOCUMENTS

| | | | |
|---|---|---|---|
| 8,407,403 B2 | 3/2013 | Prabhakaran et al. | |
| 10,048,876 B2 | 8/2018 | Espeseth et al. | |
| 11,237,769 B2 | 2/2022 | Kanno | |
| 2021/0263682 A1* | 8/2021 | Jeon ...................... | G06F 3/0679 |
| 2022/0156000 A1* | 5/2022 | Inbar ...................... | G06F 3/0658 |
| 2022/0404966 A1 | 12/2022 | Kanno et al. | |
| 2023/0075437 A1* | 3/2023 | Xu .......................... | G06F 3/064 |

FOREIGN PATENT DOCUMENTS

| | | |
|---|---|---|
| CN | 112463059 | 3/2021 |
| CN | 114415967 | 4/2022 |
| CN | 115033188 | 9/2022 |

OTHER PUBLICATIONS

EESR dated Sep. 19, 2024 in corresponding EP Patent Application No. 24166407.7.

* cited by examiner

*Primary Examiner* — Eric Cardwell
(74) *Attorney, Agent, or Firm* — MORGAN, LEWIS & BOCKIUS LLP

(57) ABSTRACT

A storage device includes: a NAND chip array having a plurality of NAND chips; a ZONE switcher configured to control output of write data to a ZONE cache when a ZONE write command is received; the ZONE cache configured to cache the write data in a cache space corresponding to a ZONE among a plurality of zones; and a ZONE persistence controller configured to control storing, in parallel, the write data in at least two of the plurality of ZONEs cached in the ZONE cache in NAND chips of the NAND chip array corresponding to the plurality of ZONEs.

20 Claims, 19 Drawing Sheets

STORAGE DEVICE AND DATA ACCESS METHOD THEREOF

CROSS-REFERENCE TO RELATED APPLICATION

This application claims priority under 35 U.S.C. § 119 to Chinese Patent Application No. 202311075033.8 filed on Aug. 24, 2023, in the Chinese Intellectual Property Office, the disclosure of which is incorporated by reference herein in its entirety.

1. TECHNICAL FIELD

The disclosure relates to the field of semiconductors, and more particularly, to a storage device, a data access method performed by the storage device, a storage system, a host storage system, a data center system, a computer readable storage medium, and an electronic device.

2. DISCUSSION OF RELATED ART

Zoned storage is a class of storage devices that have an address space that is divided into zones having write constraints that may differ from regular storage devices. A Zoned Name Space (ZNS) storage device is an example of a device that supports zoned storage. For example, a solid-state-device (SSD) may be used to implement the ZNS.

A present type of ZNS storage device only supports in-order write when writing data to each zone. An internal error will be triggered if an application attempts to write data to a ZONE non-sequentially. The application may use a synchronous input-output (IO) mode to ensure there is only one write IO request in an IO stack to maintain the in-order write. However, use of the synchronous IO mode results in unsatisfactory write performance. The application may distribute the data across a plurality of ZONEs to increase write performance when a large amount of data needs to be stored. However, distributing the data may consume a large amount of computational resources and make it difficult to adapt the application to the storage device.

SUMMARY

According to an aspect of the present disclosure, there is provided a storage device. The storage device includes: a NAND chip array including a plurality of NAND chips; a ZONE switcher (e.g., a first control circuit), a ZONE cache and a ZONE persistence controller (e.g., a second control circuit). The ZONE switcher is configured to control output of write data to a ZONE cache when a ZONE write command is received. The ZONE cache is configured to cache the write data in a cache space corresponding to a ZONE. The ZONE persistence controller is configured to control storing, in parallel, the write data in at least two of the plurality of ZONEs cached in the ZONE cache in the NAND chips corresponding to the plurality of ZONEs.

Alternatively, the ZONE switcher is configured to control writing of the write data to the cache space corresponding to the ZONE in the ZONE cache according to a first write operation request order, wherein the first write operation request order is different from a second write operation request order of an application to the ZONE.

Alternatively, the ZONE switcher is further configured to: allocate the cache space corresponding to the ZONE in the ZONE cache when a ZONE open command is received; and inform the ZONE persistence controller about a plurality closed ZONEs when at least one ZONE close command is received.

Alternatively, the ZONE persistence controller is configured to: map each of the plurality of closed ZONEs to the NAND chips in the NAND chip array and control storing, in parallel, the write data in the plurality of ZONEs cached in the ZONE cache in the NAND chips to which each of the ZONEs is mapped, according to a current idle state of the NAND chip array.

Alternatively, the ZONE persistence controller is further configured to: set a state of each of the ZONEs to a first state after storing the write data in the plurality of ZONEs in parallel in the NAND chips to which each of the ZONEs is mapped.

Alternatively, the ZONE switcher is further configured to: set a state of the ZONE to a second state after the write data is cached in the cache space corresponding to the ZONE.

Alternatively, the ZONE switcher is further configured to: determine, when a ZONE read command is received, whether read data to be read is stored in the ZONE cache or in the NAND chip array; if the read data to be read is stored in the ZONE cache, read the read data from the ZONE cache; if the read data to be read is stored in the NAND chip array, read the read data from the NAND chip array.

Alternatively, the ZONE switcher is configured to determine, when the ZONE read command is received, whether the read data to be read is stored in the ZONE cache or in the NAND chip array according to a state of the ZONE in which the read data to be read is located, wherein if the state of the ZONE in which the read data to be read is located is a first state, the read data is read from NAND chips in the NAND chip array corresponding to the ZONE in which the read data to be read is located; if the state of the ZONE in which the read data to be read is located is a second state, the read data is read from a cache space in the ZONE cache corresponding to the ZONE in which the read data to be read is located.

According to an aspect of the present disclosure, there is provided a data access method performed by a storage device. The storage device includes a NAND chip array, a ZONE switcher, a ZONE cache, and a ZONE persistence controller. The data access method includes: the ZONE switcher controlling output of the write data to the ZONE cache when a ZONE write command is received; the ZONE cache caching the write data in a cache space corresponding to a ZONE; and the ZONE persistence controller controlling storing, in parallel, the write data in a plurality of ZONEs cached in the ZONE cache in NAND chips of the NAND chip array corresponding to the plurality of ZONEs.

Alternatively, the ZONE switcher controlling output of the write data to the ZONE cache includes: controlling writing of the write data to the cache space corresponding to the ZONE in the ZONE cache in a first write operation request order, wherein the first write operation request order is different from a second write operation request order of an application to the ZONE.

Alternatively, the data access method further includes: the ZONE switcher allocating the cache space corresponding to the ZONE in the ZONE cache when a ZONE open command is received; and the ZONE switcher informing the ZONE persistence controller about a plurality of closed ZONEs when at least one ZONE close command is received.

Alternatively, the ZONE persistence controller controlling of the storing, in parallel, of the write data in a plurality of ZONEs cached in the ZONE cache in NAND chips of the NAND chip array corresponding to the plurality of ZONEs, includes: the ZONE persistence controller mapping each of the plurality of closed ZONEs to the NAND chips in the NAND chip array and controlling storing, in parallel, the write data in the plurality of ZONEs cached in the ZONE cache in the NAND chips to which each of the ZONEs is mapped, according to a current idle state of the NAND chip array.

Alternatively, the data access method further includes: the ZONE persistence controller setting a state of the each of the ZONEs to a first state after storing the write data in the plurality of ZONEs in parallel in the NAND chips to which each of the ZONEs is mapped.

Alternatively, the data access method further includes: the ZONE switcher setting a state of the ZONE to a second state after the write data is cached in the cache space corresponding to the ZONE.

Alternatively, the data access method further includes: the ZONE switcher determining whether read data to be read is stored in the ZONE cache or in the NAND chip array when a ZONE read command is received; if the read data to be read is stored in the ZONE cache, the ZONE switcher reading the read data from the ZONE cache; and if the read data to be read is stored in a NAND chip array, the ZONE switcher reading the read data from the NAND chip array.

Alternatively, the ZONE switcher determining whether the read data to be read is stored in the ZONE cache or in the NAND chip array when a ZONE read command is received, includes: determining, when the ZONE read command is received, whether the read data to be read is stored in the ZONE cache or in the NAND chip array according to a state of the ZONE in which the read data to be read is located, wherein if the state of the ZONE in which the read data to be read is located is a first state, the read data is read from NAND chips in the NAND chip array corresponding to the ZONE in which the read data to be read is located; if the state of the ZONE in which the read data to be read is located is a second state, the read data is read from a cache space in the ZONE cache corresponding to the ZONE in which the read data to be read is located.

According to an aspect of the present disclosure, there is provided a storage system, the storage system includes: a main processor; a memory; and a storage device; wherein the storage device is configured to perform the data access method as described above.

According to an aspect of the present disclosure, there is provided a host storage system, the host storage system includes: a host; and a storage device; wherein the storage device is configured to perform the data access method as described above.

According to an of the present disclosure, there is provided a data center system, the data center system includes: a plurality of application servers; and a plurality of storage servers; wherein each storage server comprises a storage device, wherein the storage device is configured to perform the data access method as described above.

According to an aspect of the present disclosure, there is provided a computer readable storage medium having a computer program stored thereon, wherein the data access method as described above is implemented when the computer program is executed by a processor.

According to an aspect of the present disclosure, there is provided an electronic apparatus, the electronic apparatus includes: a processor; and a memory storing a computer program, the computer program, when executed by the processor, implementing the data access method as described above.

At least one embodiment of the disclosure supports an out-of-order write in a zoned storage device to increase read and write performance.

According to an aspect of the present disclosure, there is provided a Zoned Name Space (ZNS) storage device that includes a memory, a cache, and a controller. The memory includes a plurality of zones. The controller is configured to receive a ZONE write command to write data in-order into a first zone among the plurality of zones of the memory, write the data in-order into a portion of the cache associated with the first zone, and write the data out-of-order from the portion of the cache to the first zone of the memory. The controller may write the data out-of-order during an asynchronous input-output (IO) mode and the controller may write the data in-order to one of the plurality of zones of the memory during a synchronous IO mode

BRIEF DESCRIPTION OF THE DRAWINGS

Embodiments will be more clearly understood from the following detailed description taken in conjunction with the accompanying drawings in which.

DETAILED DESCRIPTION

Embodiments of the disclosure will be described clearly and completely below in conjunction with the accompanying drawings to enable a person of ordinary skill in the art to implement the same.

An embodiment of the present disclosure provides a storage device that supports an out-of-order write to remove the limitations of existing ZNS storage devices and increase write performance.

Herein, the inventive concept of the present disclosure is introduced with the example that the storage device is a ZNS SSD. However, the ZNS storage device in the present disclosure is not limited to the ZNS SSD, but may, for example, also be a ZNS hard-disk-drive (HDD).

For ease of understanding, a brief introduction of the ZNS SSD will be given first.

Figure 1:
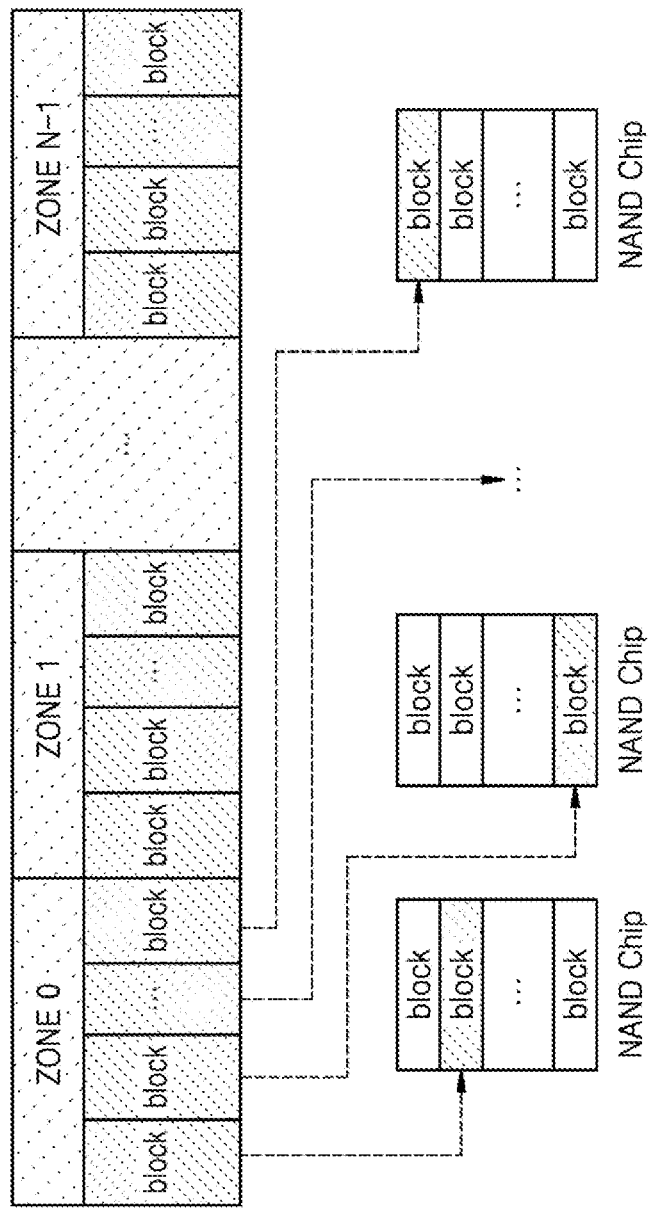
FIG. 1 illustrates a ZONE division and block mapping of a ZNS SSD.

FIG. 1 illustrates a ZONE division and block mapping of a ZNS SSD. As shown in FIG. 1, the ZNS SSD divides the storage space of an SSD into equal-sized ZONEs. Each ZONE occupies one or more NAND blocks. The NAND blocks may be distributed across different flash dies. For example, one ZONE may be mapped to a plurality of NAND chips to increase a data read speed. Due to this space division means of the ZNS SSD, the following limitations arise for the ZNS SSD:

(1) When writing one ZONE, only in-order write is supported. Therefore, the write queue depth can only be 1 and otherwise an internal error of the SSD will be triggered.

(2) The number of ZONEs that may be opened at the same time is limited (e.g., usually between a few dozen and a few hundred).

(3) When writing a ZONE, the ZONE needs to be opened first, and when one ZONE space is written until it becomes full or there is no need to write data to the ZONE anymore, a close operation needs to be performed.

(4) The ZONE needs to be recycled before data can be written into it again.

However, as shown in the table below, read and write performance of the NAND chip (e.g., a flash die) is very low compared to read and write performance provided to the outside by the SSD.

| | Storage medium | | | |
|---|---|---|---|---|
| Flash Die | SATA 6G | PCIe Gen 3 x4 | PCIe Gen 4 x4 | PCIe Gen 5 x4 |
| bandwidth <100 MB/s | 600 MB/s | 3 GB/s | 6 GB/s | 14 GB/s |

Figure 2:
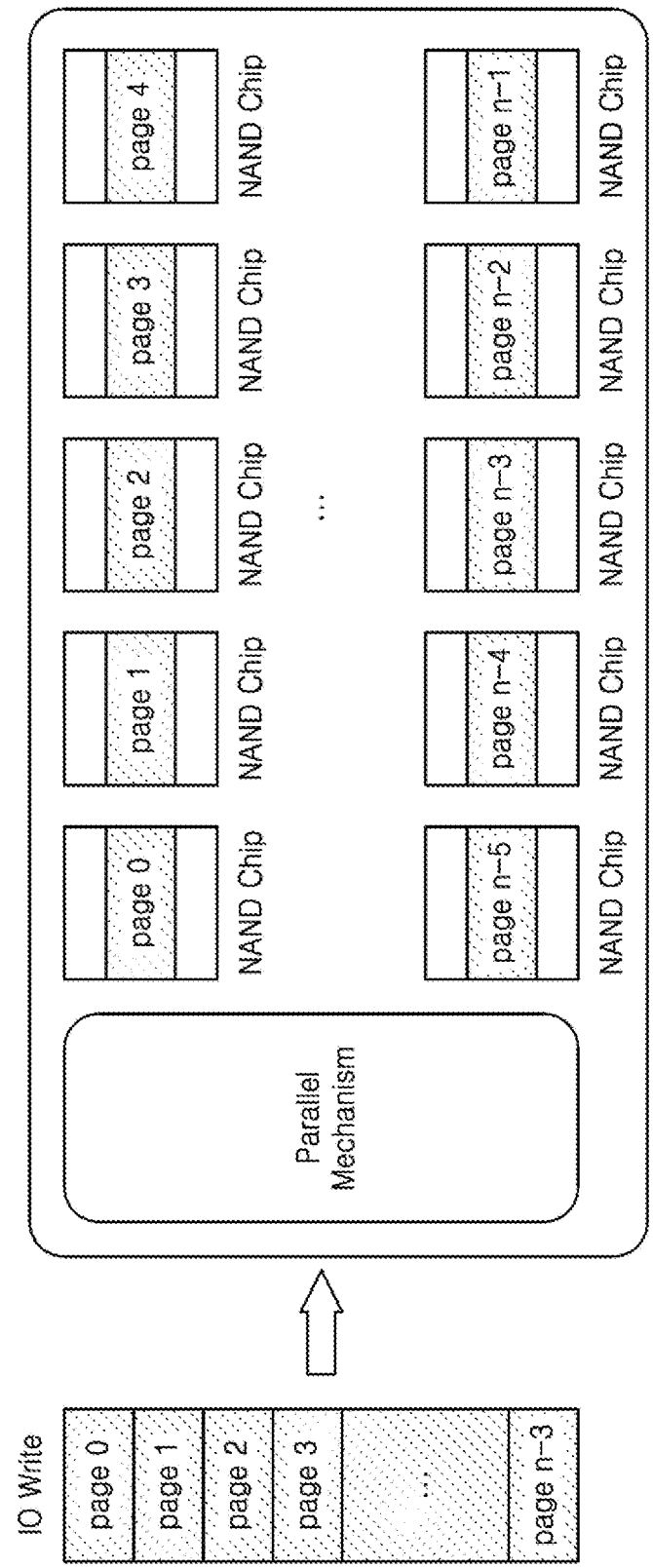
FIG. 2 shows an internal parallel mechanism of an SSD.

The internal of the SSD may employ a parallel mechanism to provide high speed read and write bandwidth to the outside. For example, a plurality of NAND chips may provide services at the same time. Therefore, the external read and write bandwidth of the SSD is equal to the sum of the bandwidth of all the NAND chips. FIG. 2 is a diagram of an internal parallel mechanism of an SSD. As shown in FIG. 2, a plurality of pages are mapped to a plurality of flash dies in parallel when performing an write operation.

In addition, upper layer data may go through a block layer and a device driver of the processor (e.g., a LINUX kernel) before being written into the SSD. In this procedure, write order submitted by the application and actual write order performed by the SSD are not necessarily the same. To meet different needs, the LINUX kernel, for example, provides two types of IO submissions:

Asynchronous IO mode: This mode is used by an application that does not have strict requirements for the actual order of IO execution. In this mode, software may submit IO in batches and the SSD handles each IO request seamlessly, thus providing higher data throughput rates.

Synchronous IO mode: This mode is used when an application requires data write operations to be executed in a strict order. To ensure the actual order of IO execution, the application needs to wait for the previous operation to be completed and return before issuing a new IO request, and then issues the new IO request. This operation procedure may have excessive waiting times, and thus its performance is poor.

Figure 3:
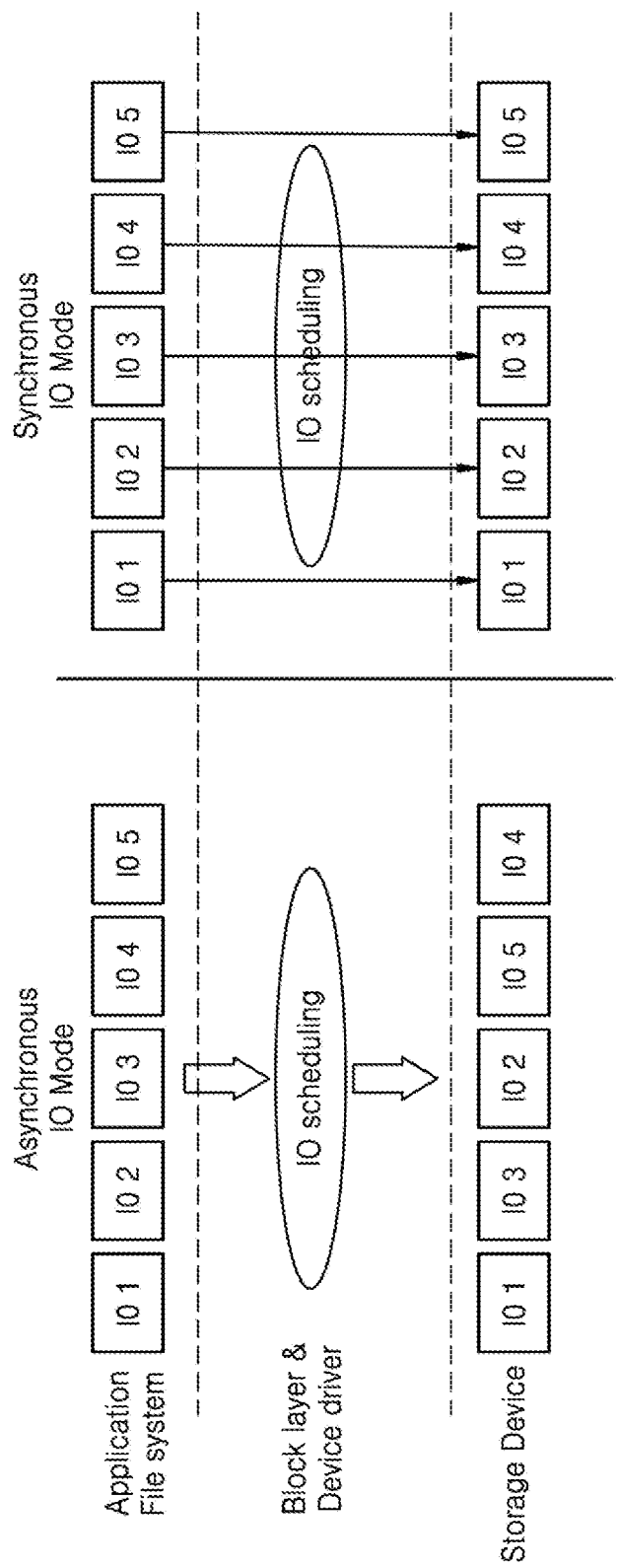
FIG. 3 shows a comparison of a synchronous IO mode and an asynchronous IO mode.

FIG. 3 shows a comparison of a synchronous IO mode and an asynchronous IO mode.

As shown in FIG. 3, for the asynchronous IO mode, the application or a file system submits an IO request to the block layer and device driver, and then immediately returns and processes the next IO request. After IO scheduling at the block layer and device driver, the actual order of the IO request processed by the storage device may be different from the order of the IO request originally submitted. However, for the synchronous IO mode, after the application or the file system submits an IO request to the block layer and the device driver, it needs to wait for the storage device to process and return its result, and then, the next IO request can be made.

Figure 4:
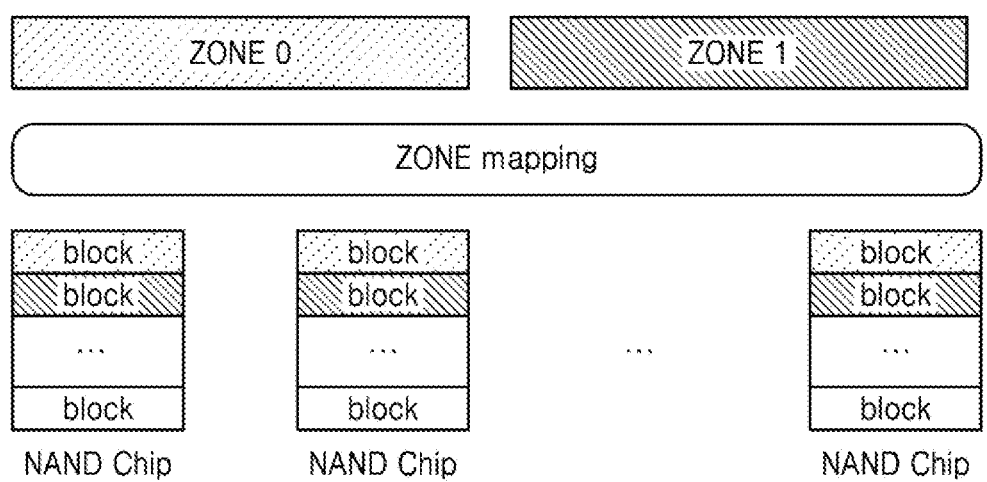
FIG. 4 illustrates block mapping of a large ZONE ZNS SSD.

In addition, according to the size of the ZONE, the ZNS SSD may be divided into two categories: a large ZONE ZNS SSD and a small ZONE ZNS SSD. For the large ZONE SSD, since its ZONE is large enough, the number of NAND blocks it occupies is large enough. As a result, one ZONE may encompass some or all the NAND chips. Therefore each write operation of the ZONE can utilize the performance of some or all the NAND chips. FIG. 4 illustrates block mapping of a large ZONE ZNS SSD. As shown in FIG. 4, both ZONE 0 and ZONE 1 may be mapped to a plurality of the NAND chips. For example, ZONE 0 maps to a respective block in each of the NAND chips and ZONE 1 maps to a respective block in each of the NAND chips.

Figure 5:
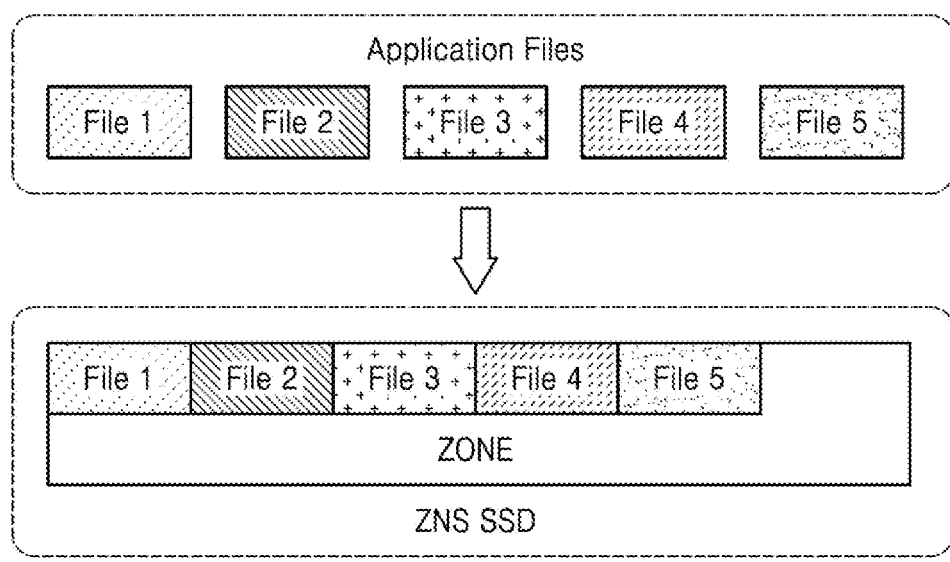
FIG. 5 illustrates files distribution on a large ZONE.

One suitable application scenario for the ZNS SSD is an application based on a log-structured merge-tree (LSM-Tree) data engine. The common file size of the file in this data engine is 8 megabytes (MB) to several hundred MB. As a result, the application has to store a plurality of files on the same ZONE. This results in files on one ZONE not being able to be invalidated at the same time and ZONE recycling being impossible. To recycle free space, the application needs to copy the remaining valid files on a plurality of ZONEs to other ZONEs and then recycle the ZONEs. For example, all valid files from a first zone need to first be moved to a second zone before the first zone can be recycled. FIG. 5 illustrates file distribution on a large ZONE. As shown in FIG. 5, file 1, file 2, file 3, file 4, and file 5 are stored in the same ZONE.

Figure 6:
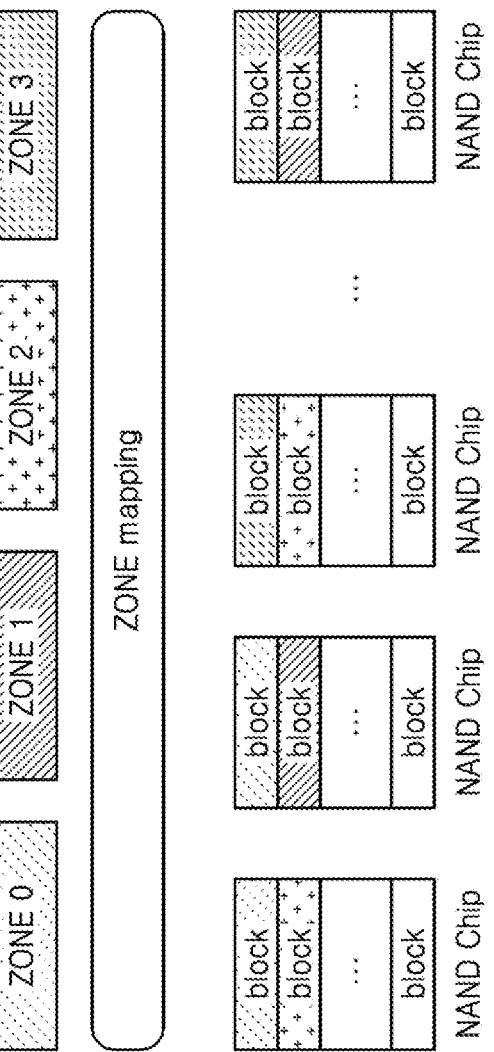
FIG. 6 illustrates block mapping of a small ZONE ZNS SSD.

For a small ZONE SSD, since its ZONE is very small, in most cases it can only occupy a very small number of NAND chips, which results in only a small number of NAND chips serving it, and thus limiting its write performance and read performance. FIG. 6 illustrates block mapping of a small ZONE ZNS SSD. As shown in FIG. 6, each ZONE is mapped to only two NAND chips or two flash dies. For example, ZONE 0 is mapped to a first NAND chip and a second NAND chip, ZONE 1 is mapped to a second NAND chip and a last NAND chip, ZONE 2 is mapped to the first NAND chip and a third NAND chip, and ZONE 3 is mapped to the third NAND chip and the last NAND chip.

Figure 7:
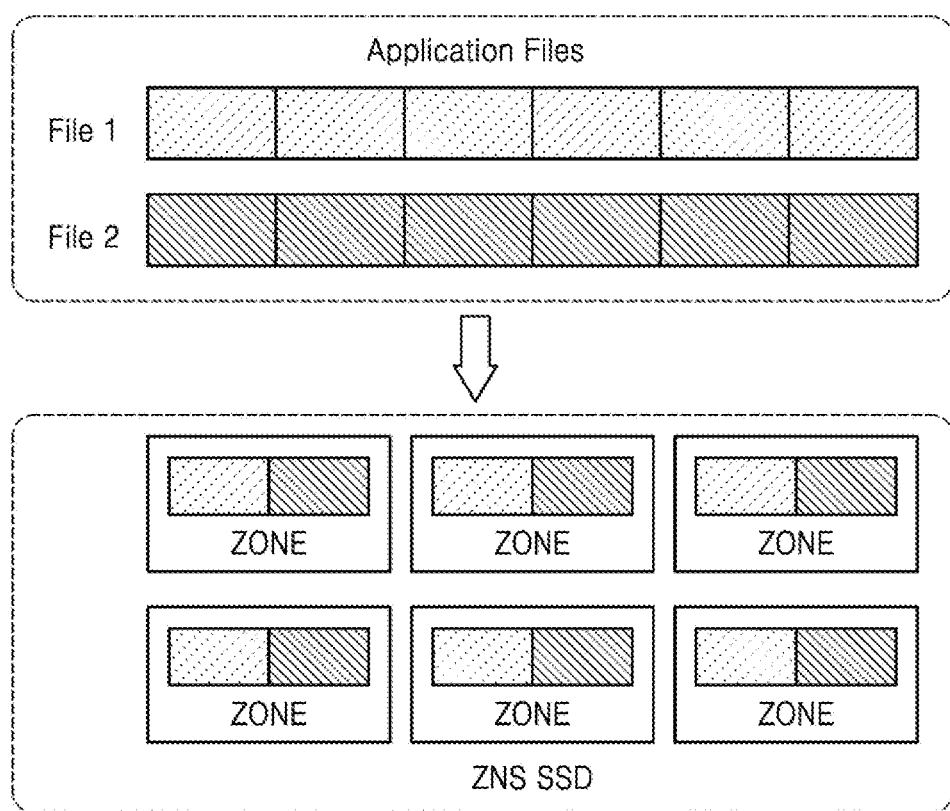
FIG. 7 illustrates files distribution on a small ZONE.

Since the ZONE write operation needs to be an in-order write, when writing data to the ZNS SSD, the software needs to use the synchronous IO mode or other means to ensure that there is only one write IO request in the IO stack. Thus, the write IO queue depth is 1, which results in very poor write performance. To ensure write efficiency, the application has to divide a file into a plurality of small fragments and write these small fragments to a plurality of ZONEs, which also causes a recycling problem in the large ZONE as well. FIG. 7 illustrates file distribution on a small ZONE. As shown in FIG. 7, both file 1 and file 2 are divided into a plurality of small fragments and then written into a plurality of ZONEs. For example, each of the ZONES may include a corresponding one of the fragments of file 1 and a corresponding one of the fragments of file 2.

Based on the above description of the ZNS SSD, the existing ZNS SSD have the following problems:

In order to maximize the read and write bandwidth of all the NAND chips, the ZONE exposed by the large ZONE SSD to the application is too large, which results in limited application scenarios for the ZNS SSD, while leading to additional application level ZONE recycling.

To provide optimal ZNS SSD application scenarios (with a file size between a few megabytes and hundreds of megabytes), the small ZONE ZNS SSD limits the write queue depth of the SSD, which results in very unsatisfactory read and write performance.

The LSM-Tree data storage engine is a widely used database in data centers, which uses a file size typically between a few megabytes and hundreds of megabytes. Both the present large ZONE ZNS SSD and small ZONE ZNS SSD require additional file distribution and application-level garbage collection (ZONE recycling) mechanisms. These additional software mechanisms not only occupy the computing resources of the host, but also increase the difficulty of adapting the software to the ZNS SSD.

Accordingly, at least one embodiment of the present disclosure uses a cache with persistence characteristics to cache ZONE data being written, and then writes the cached data of a plurality of ZONEs, simultaneously, to a NAND chip array.

Figure 8:
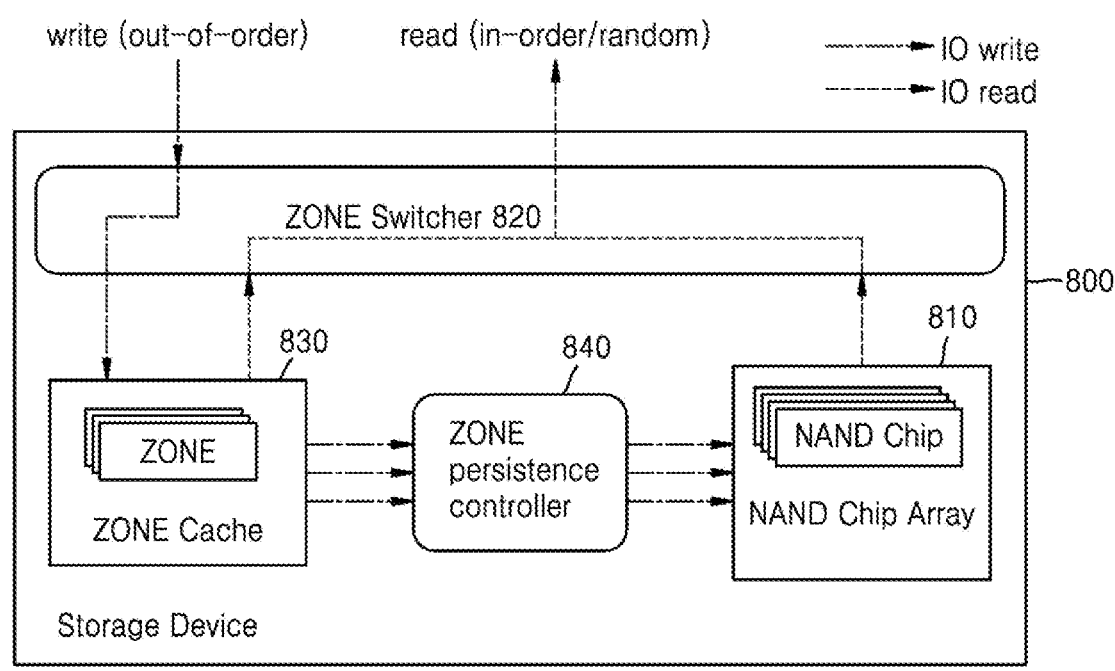
FIG. 8 illustrates a diagram of a storage device according to an embodiment.

FIG. 8 illustrates a diagram of a storage device according to an embodiment.

As shown in FIG. 8, the storage device 800 includes a NAND chip array 810, a ZONE switcher 820, a ZONE cache 830, and a ZONE persistence controller 840 (which may also be referred to as a "ZONE persistent core"). The ZONE switcher 820 may be configured to control output of write data to the ZONE cache 830 when a ZONE write command is received. The ZONE switcher 820 may be implemented by a control circuit, a processor, or a logic circuit. The ZONE persistence controller 840 may be implemented by a control circuit, a processor, or a logic circuit. The ZONE cache 830 may be configured to cache the written data in a cache space corresponding to a ZONE. In an embodiment, the ZONE persistence controller 840 is configured to control storing, in parallel, the data in a plurality of ZONEs cached in the ZONE cache 830 in NAND chips of the NAND chip array 810 corresponding to the plurality of ZONEs.

Specifically, the ZONE switcher 820 may control writing of the data to the cache space corresponding to the ZONE in the ZONE cache 830 in a first write operation request order. The first write operation request order is different from a second write operation request order of an application to the ZONE. Here, the second write operation request order may be the order of an asynchronous write operation request. The ZONE cache 830 may achieve a write rate higher than that of the NAND chip array 810.

As described above with reference to FIG. 3, when the application submits the order of the asynchronous write operation request to the block layer and the device driver of the processor, the actual order of the write operation request processed by the storage device 800 (the first write operation request order) may become different from the second write operation request order of the application through IO scheduling at the block layer and the device driver. Since the ZONE switcher 820 controls, when the ZONE write command is received, output of write data to the ZONE cache 830 instead of writing the write data directly to the NAND chip array 810, as a result, an embodiment of the present disclosure may support out-of-order write of the ZONE and the asynchronous IO operation. Thus, limitation of the original ZNS SSD write queue depth of 1 may be overcome and the ZNS SSD write performance may be increased.

Figure 9:
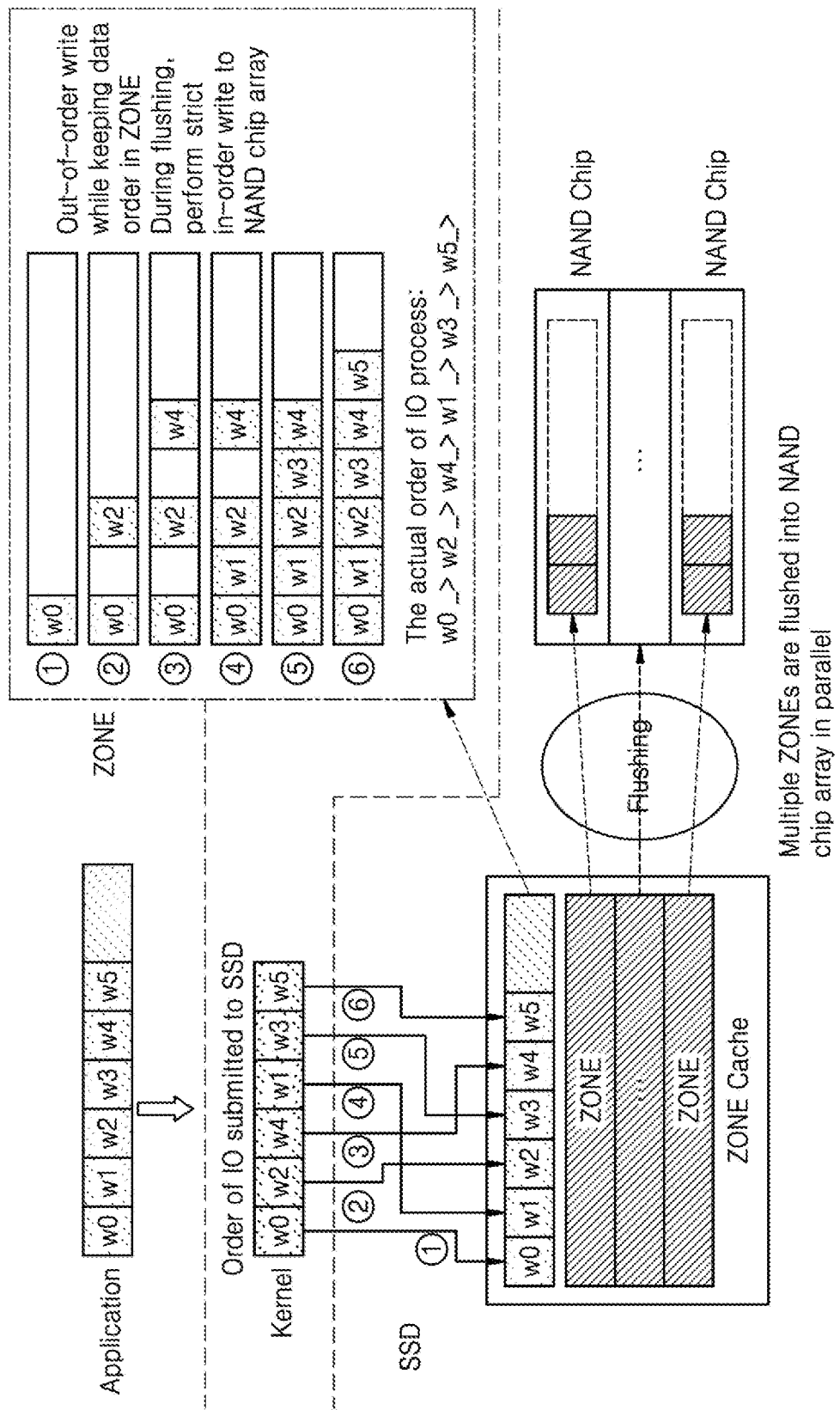
FIG. 9 illustrates a diagram of an out-of-order write operation of a ZONE.
Figure 10:
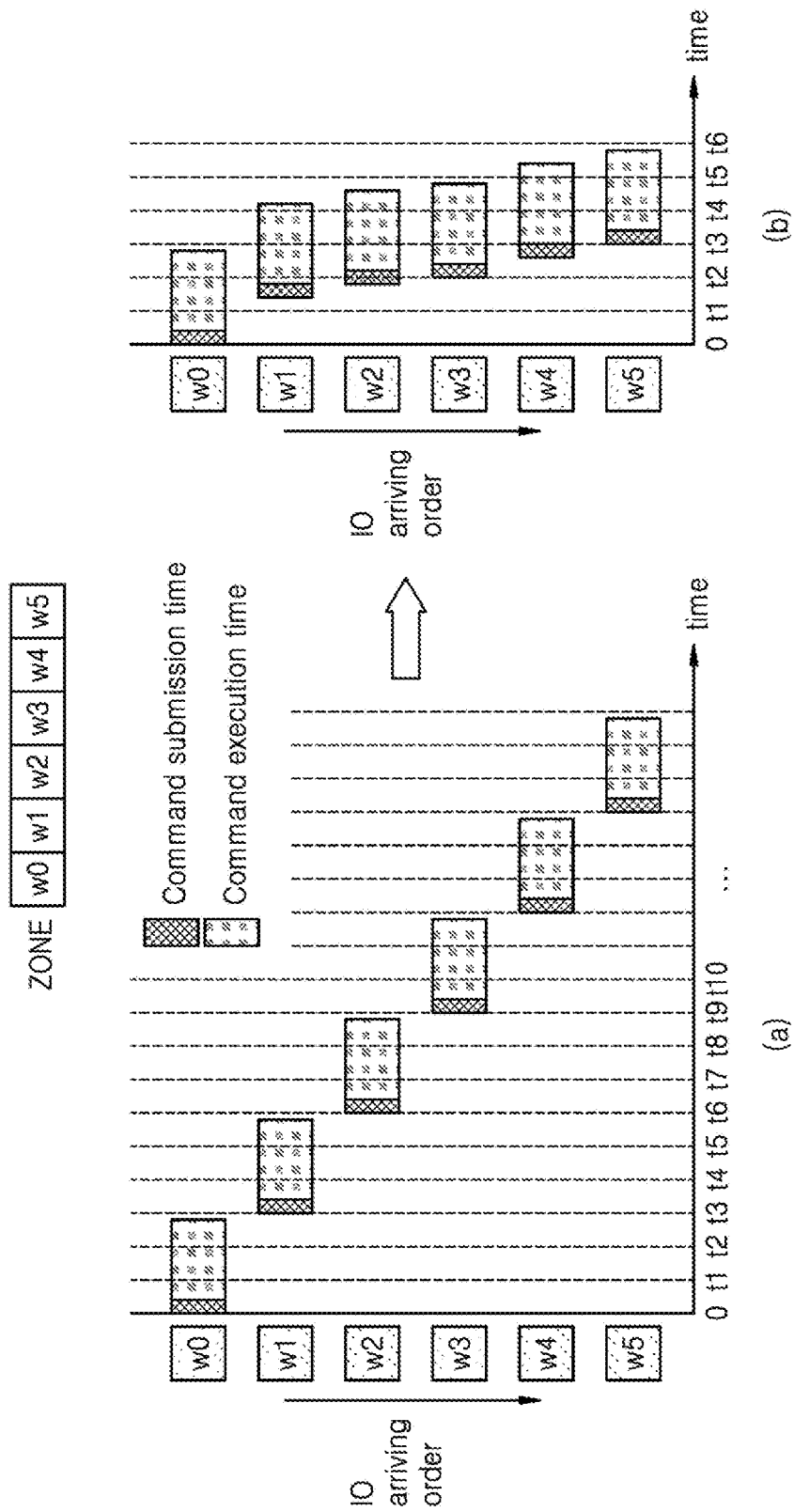
FIG. 10 illustrates a comparison of IO process with and without out-of-order write characteristics.

FIG. 9 illustrates a diagram of an out-of-order write operation of a ZONE. As shown in FIG. 9, the application submits data of the ZONE to a kernel in batches through an asynchronous IO. For the application, it is still in-order write within the ZONE, for example, in order of w0→w1→w2→w3→w4→w5. The kernel may be a component of an operating system. The offset addresses of w0, w1, w2, . . . within the ZONE are consecutive without interruption. Subsequently, after going through the multi-queue mechanism of the kernel, the order in which the SSD actually processes write operations may be disrupted. In the example of the figure below, the actual order of process is: w0→w2→w4→w1→w3→w5. For example, the data is written in-order to the ZONE cache 830 so it can potentially be written out-of-order to the ZNS SSD. According to the offset address of each write operation (w0~w5), the ZONE cache 830 writes to the corresponding location in the cache space corresponding to the ZONE while reserving locations for other write operations. With the out-of-order write characteristics, the application may perform the write operations to the ZNS SSD using the asynchronous IO mode. This approach eliminates unnecessary waiting time. FIG. 10 illustrates a comparison of IO process with and without out-of-order write characteristics. As can be seen in part a) of FIG. 10, for the ZNS SSD without the out-of-order write characteristics, all the write operations can only be sent in order and executed in order. However, as can be seen in part b) of FIG. 10, with the out-of-order write characteristics according to an embodiment of the disclosure, all the write operations are done almost in parallel, which may significantly increase the write performance of the SSD.

According to the ZONE limitation, the ZONE may need to be turned on when writing to the ZONE and turned off when the write operation has completed. Therefore, the kernel may need to send a ZONE open command to the SSD when writing to the ZONE and a ZONE close command to the SSD after all ZONE data has been written.

Figure 11:
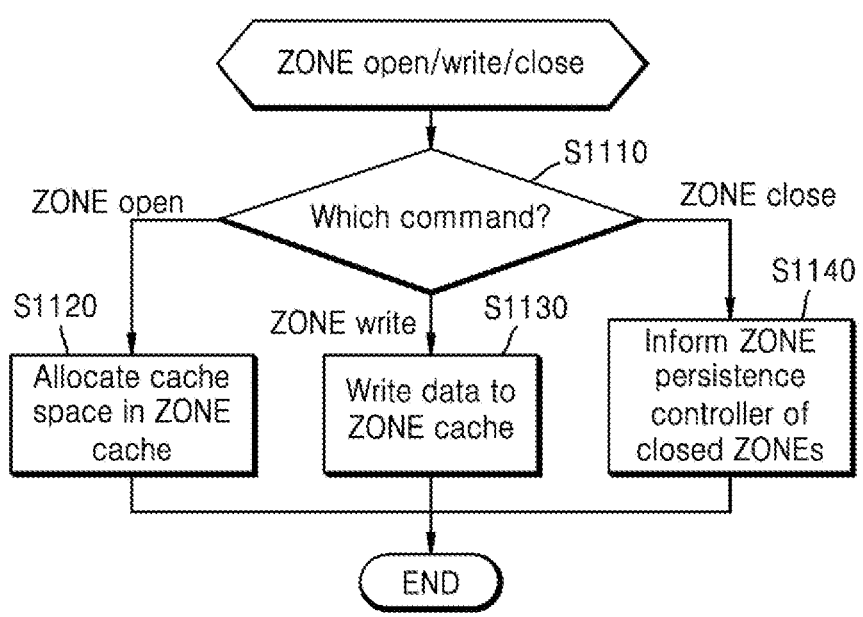
FIG. 11 illustrates a diagram of operations of a ZONE switcher.

FIG. 11 illustrates operations of the ZONE switcher 820 according to an embodiment of the disclosure. As shown in FIG. 11, when receiving a command from the kernel, the ZONE switcher 820 determines whether the received command is a ZONE write command, a ZONE read command, or a ZONE close command (S1110). The ZONE switcher 820 is configured to control output of write data to the ZONE cache 830 when the ZONE write command is received (S1130). The ZONE switcher 820 may be configured to allocate the cache space corresponding to the ZONE in the ZONE cache 830 when the ZONE open command is received (S1120), and to inform the ZONE persistence controller 840 about closed ZONEs when the ZONE close command is received (S1140). For example, the ZONE switcher 820 may send a message to the ZONE persistence controller 840 identifying a particular zone and indicating the particular zone has been closed.

In an embodiment, after all the ZONE data have been written and ZONEs have been closed, all the closed ZONEs are allocated free NAND chips and are written into the NAND chips in parallel. This procedure may ensure that as many NAND chips as possible are working simultaneously, which takes maximum advantage of the NAND chip array.

Figure 12:
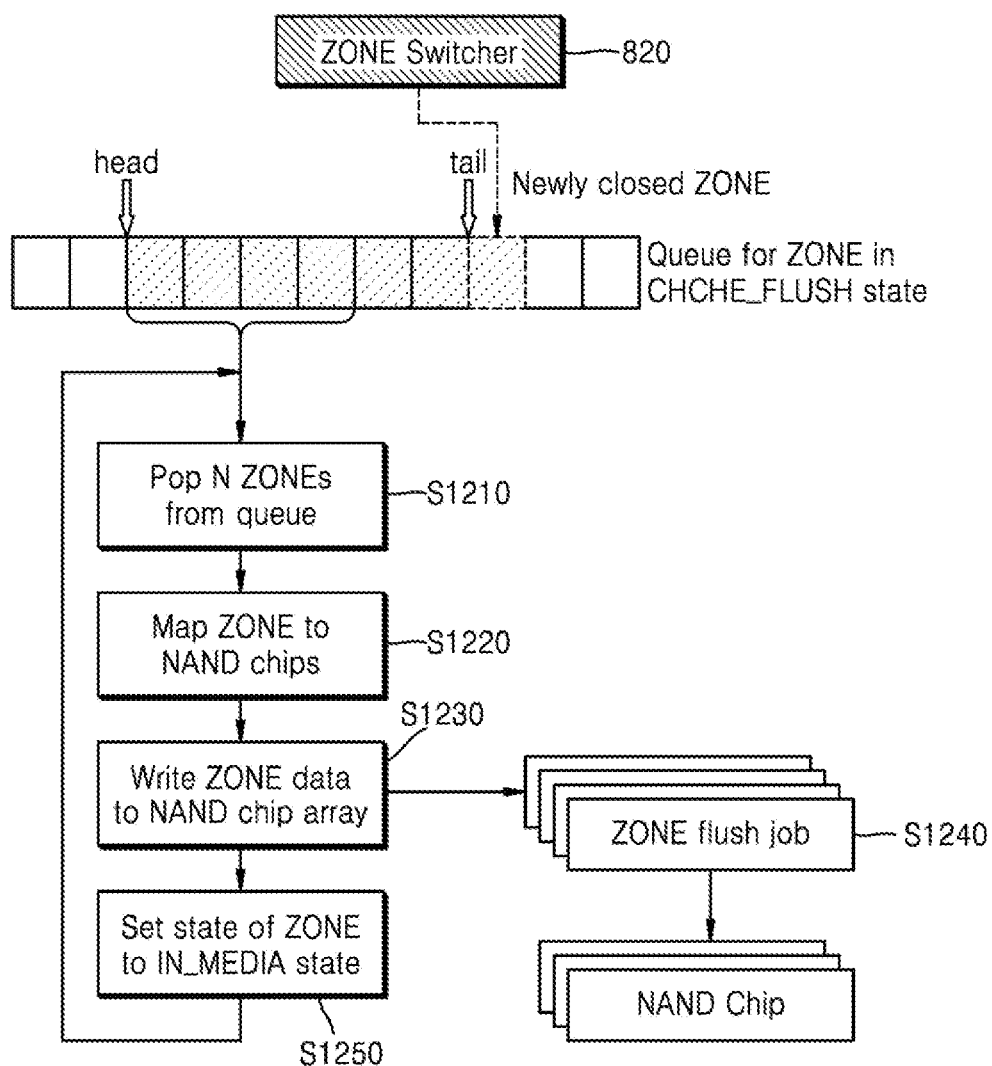
FIG. 12 illustrates a diagram of operations of a ZONE persistence controller.

FIG. 12 illustrates a diagram of operations of a ZONE persistence controller 840 according to an embodiment of the disclosure. According to an embodiment, the ZONE persistence controller 840 is configured to: map each of the closed plurality of ZONEs to the NAND chips in the NAND chip array 810 and control storing, in parallel, the data in the plurality of ZONEs cached in the ZONE cache 830 in the NAND chips to which each of the ZONEs is mapped, according to a current idle state of the NAND chip array 810. For example, as shown in FIG. 12, the ZONE switcher 820 may inform the ZONE persistence controller 840 about the newly closed ZONE whenever the ZONE close command is received. In an embodiment, the ZONE switcher 820 is further configured to set a state of the ZONE to a second state after the written data is cached in the cache space corresponding to the ZONE. The second state may be a CACHE_FLUSH state indicating that the ZONE data is in the cache. The ZONE persistence controller 840 may distribute the data as evenly as possible across all the NAND chips to enable full utilization of all the read and write bandwidth of the NAND chip array. For example, the ZONE persistence controller 840 may consider the number of ZONEs in the ZONE queue that are currently in the second state, the number of free chips in the NAND chip array, and the size of each ZONE, to determine N ZONEs to pop (or remove) from the ZONE queue, where N is an integer of 1 or more. Upon determining the number N of ZONES to pop, the ZONE persistence controller 840 pops or removes the N ZONES from the ZONE queue (S1210). The ZONE persistence controller 840 then maps each of these N ZONEs to free NAND chips in the NAND chip array 810 (S1220). Then, the data in the N ZONEs is written to the mapped NAND chips (S1230). Specifically, the data in the N ZONEs may be stored in the NAND chips via a ZONE flush operation (S1240).

Figure 13:
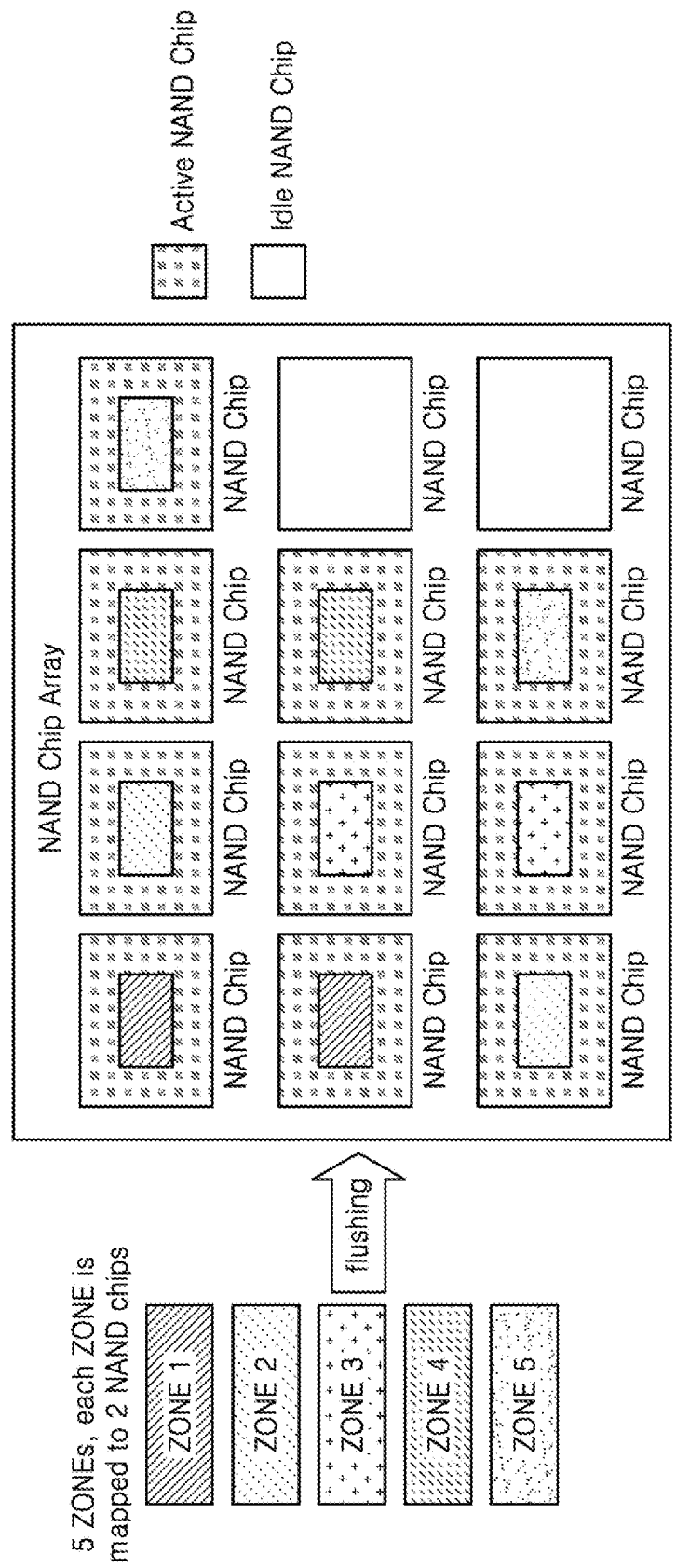
FIG. 13 illustrates a diagram of ZONE being written in parallel to a NAND array.

FIG. 13 illustrates a diagram of ZONE being written in parallel to a NAND array. As shown in FIG. 13, for example, according to the current idle state of the NAND chip array 810, data in 5 ZONEs may be stored in parallel to the NAND chip array 810 (which may also be referred to as parallel flushing to the NAND chip array), wherein each ZONE may, for example, be mapped to 2 NAND chips, i.e., 2 FLASH Dies. Due to the characteristics of NAND, internal data of each block needs to be written strictly in order. If one file occupies one ZONE, and one ZONE occupies at most one or several NAND chips, then at most several NAND chips will be working when one file is written, and the other chips will be idle. However, the upper layer software may be allowed to use the asynchronous IO mode due to the addition of the ZONE cache 830. Thus may ensure that most or even all the NAND chips can be in a working state by writing a plurality of ZONEs or the file simultaneously, and thus the write performance of ZNS SSD can be effectively increased.

Further, referring back to FIG. 12, the ZONE persistence controller 840 may also be configured to set a state of each of the ZONEs to a first state, e.g., an IN_MEDIA state, after storing the data in the plurality of ZONEs in parallel in the NAND chips to which each of the ZONEs is mapped (S1250). The first state may indicate that the data in the current ZONE has been stored in the NAND chip.

Above, the contents related to the write operation of the ZNS SSD have been described, and now a read operation of the ZNS SSD is briefly described. Referring back to FIG. 8, the ZONE switcher 820 may also be configured to determine whether the data should be read from the ZONE cache 830 or from the NAND chip array 810 (flash die Array) for a data read operation. The ZONE SSD has no limitation on the order of the read operation and thus the read operation may be performed in order or randomly.

Figure 14:
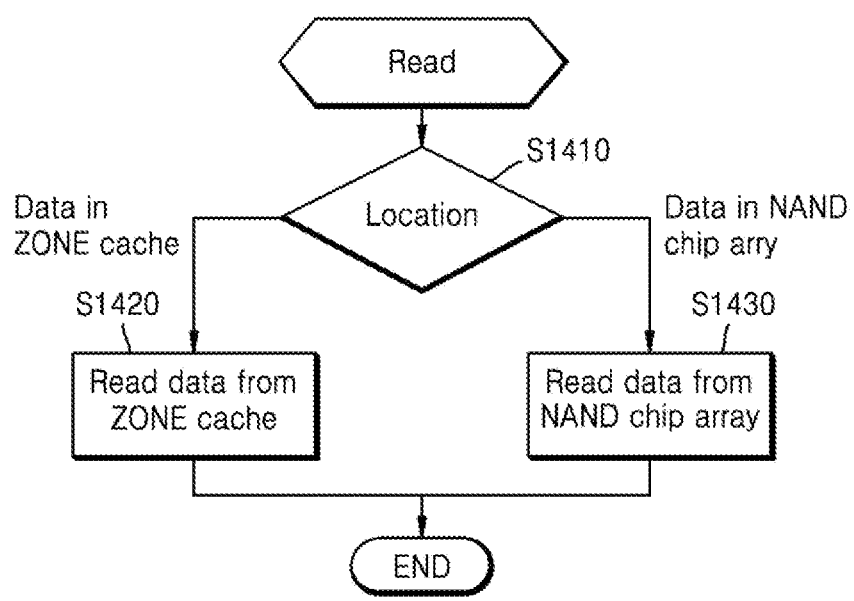
FIG. 14 is a diagram of a read operation of a ZNS SSD.

FIG. 14 is a diagram of a read operation of a ZNS SSD according to an embodiment of the disclosure. The read operation of the ZNS SSD may be controlled by the ZONE switcher 820. As shown in FIG. 14, the ZONE switcher 820 may be configured to: determine, when a ZONE read command is received, whether data to be read is stored in the ZONE cache 830 or in the NAND chip array 810 (S1410). For example, the ZONE switcher 820 may determine the location of the data to read. If the data to be read is stored in the ZONE cache 830, the ZONE switcher 820 may read the data from the ZONE cache 830 (S1420). If the data to be read is stored in the NAND chip array 810, the ZONE switcher 820 may read the data from the NAND chip array 810 (S1430). Specifically, for example, ZONE switcher 820 may be configured to determine, when a ZONE read command is received, whether the data to be read is stored in the ZONE cache 830 or in the NAND chip array 810 according to a state of the ZONE in which the data to be read is located, wherein if the state of the ZONE in which the data to be read is a first state, the data is read from NAND chips in the NAND chip array corresponding to the ZONE in which the data to be read is located, and if the state of the ZONE in which the data to be read is located is a second state, the data is read from a cache space in the ZONE cache 830 corresponding to the ZONE in which the data to be read is located. The first state indicates that the data to be read is in the ZONE cache 830, and the second state indicates that the data to be read is in the NAND chip array 810.

Figure 15:
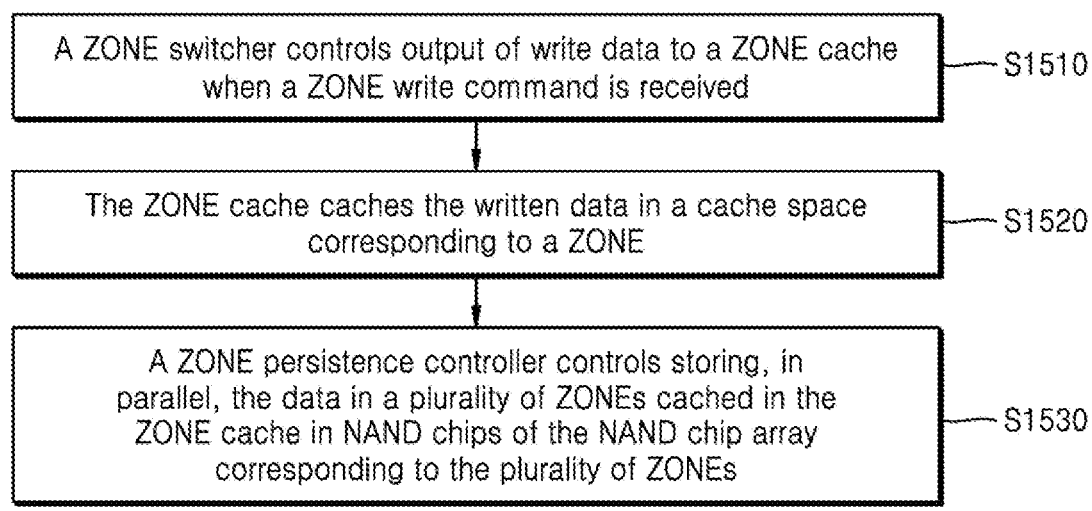
FIG. 15 is a flowchart of a data access method performed by a storage device according to an embodiment.
Figure 16:
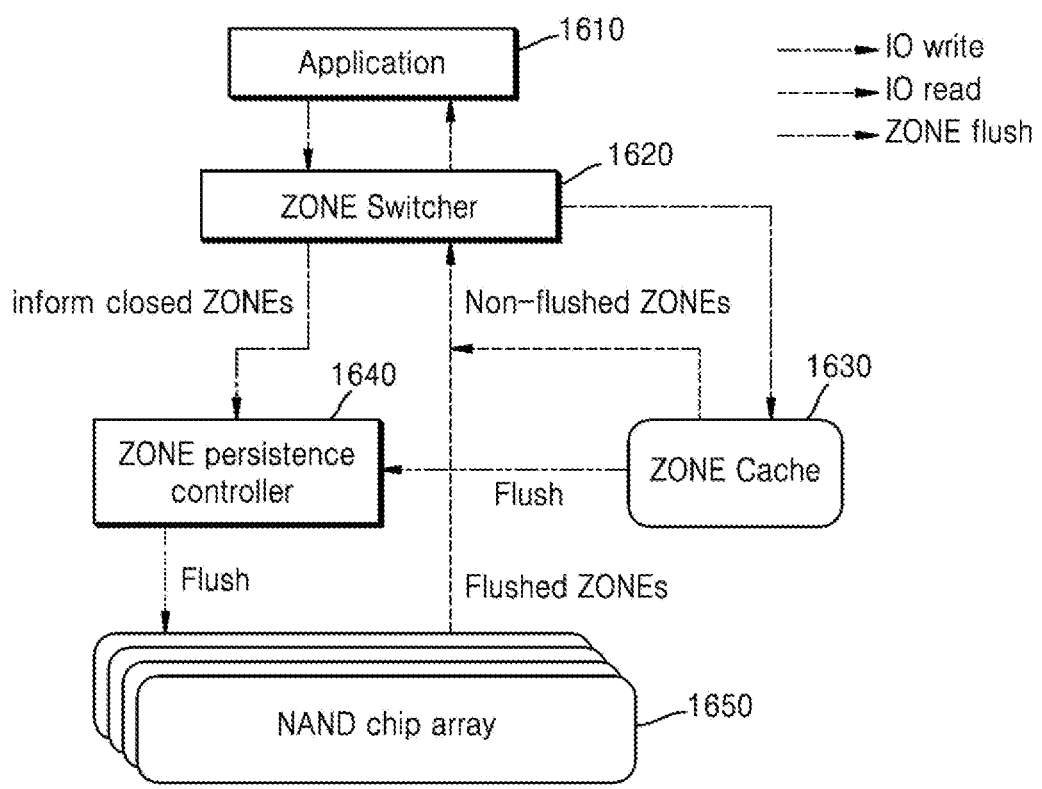
FIG. 16 is a schematic diagram of an IO flow of a ZNS SSD.

FIG. 15 is a flowchart of a data access method performed by a storage device according to an embodiment. The data access method of the present disclosure is described below with reference to FIG. 15 and in conjunction with an IO flow of a ZNS SSD illustrated in FIG. 16. Referring to FIG. 15, at step S1510, a ZONE switcher 1620 controls output of write data to a ZONE cache 1630 when a ZONE write command is received. For example, when an IO write command is received from an application 1610, the ZONE switcher 1620 may control writing of the data to the cache space corresponding to the ZONE in the ZONE cache 1630 according to a first write operation request order. The first write operation request order is different from a second write operation request order of an application to the ZONE. Next, at step S1520, the ZONE cache 1630 caches the written data in a cache space corresponding to a ZONE. Finally, at step S1530, a ZONE persistence controller 1640 controls storing, in parallel, the data in a plurality of ZONEs cached in the ZONE cache 1630 in NAND chips of the NAND chip array 1650 corresponding to the plurality of ZONEs.

Alternatively, the data access method of FIG. 15 may further include: the ZONE switcher 1620 allocating the cache space corresponding to the ZONE in the ZONE cache 1630 when a ZONE open command is received; and the ZONE switcher 1620 informing the ZONE persistence controller 1640 about a closed ZONE when a ZONE close command is received.

Alternatively, the step S1530 may include: the ZONE persistence controller 1640 mapping each of the closed plurality of ZONEs to the NAND chips in the NAND chip array 1650 and controlling storing, in parallel, the data in the plurality of ZONEs cached in the ZONE cache 1630 in the NAND chips to which each of the ZONEs is mapped, according to a current idle state of the NAND chip array 1650.

Alternatively, the data access method of FIG. 15 may further include: the ZONE persistence controller 1640 setting a state of the each of the ZONEs to a first state after storing the data in the plurality of ZONEs in parallel in the NAND chips to which each of the ZONEs is mapped. For example, the first state may indicate the data is stored in the NAND chip array 1650.

Alternatively, the data access method of FIG. 15 may further include: the ZONE switcher 1620 setting a state of the ZONE to a second state after the written data is cached in the cache space corresponding to the ZONE. For example, the second state may indicate the data is stored in the cache space.

Alternatively, the data access method of FIG. 15 may further include: the ZONE switcher 1620 determining whether data to be read is stored in the ZONE cache 1630 or in the NAND chip array 1650 when a ZONE read command is received. If the data to be read is stored in the ZONE cache 1630, the ZONE switcher 1620 may read the data from the ZONE cache 1630. If the data to be read is stored in the NAND chip array 1650, the ZONE switcher 1620 may read the data from the NAND chip array 1650. For example, when the ZONE read command is received, it may be determined whether the data to be read is stored in the ZONE cache 1630 or in the NAND chip array 1650 according to a state of the ZONE in which the data to be read is located. If the state of the ZONE in which the data to be read is the first state, the data is read from NAND chips in the NAND chip array 1650 corresponding to the ZONE in which the data to be read is located. If the state of the ZONE in which the data to be read is the second state, the data is read from a cache space in the ZONE cache 1630 corresponding to the ZONE in which the data to be read is located.

The storage device and the data access method of the storage device according to at least one embodiment of the disclosure can support a ZONE out-of-order write, which can provide higher read and write performance.

Figure 17:
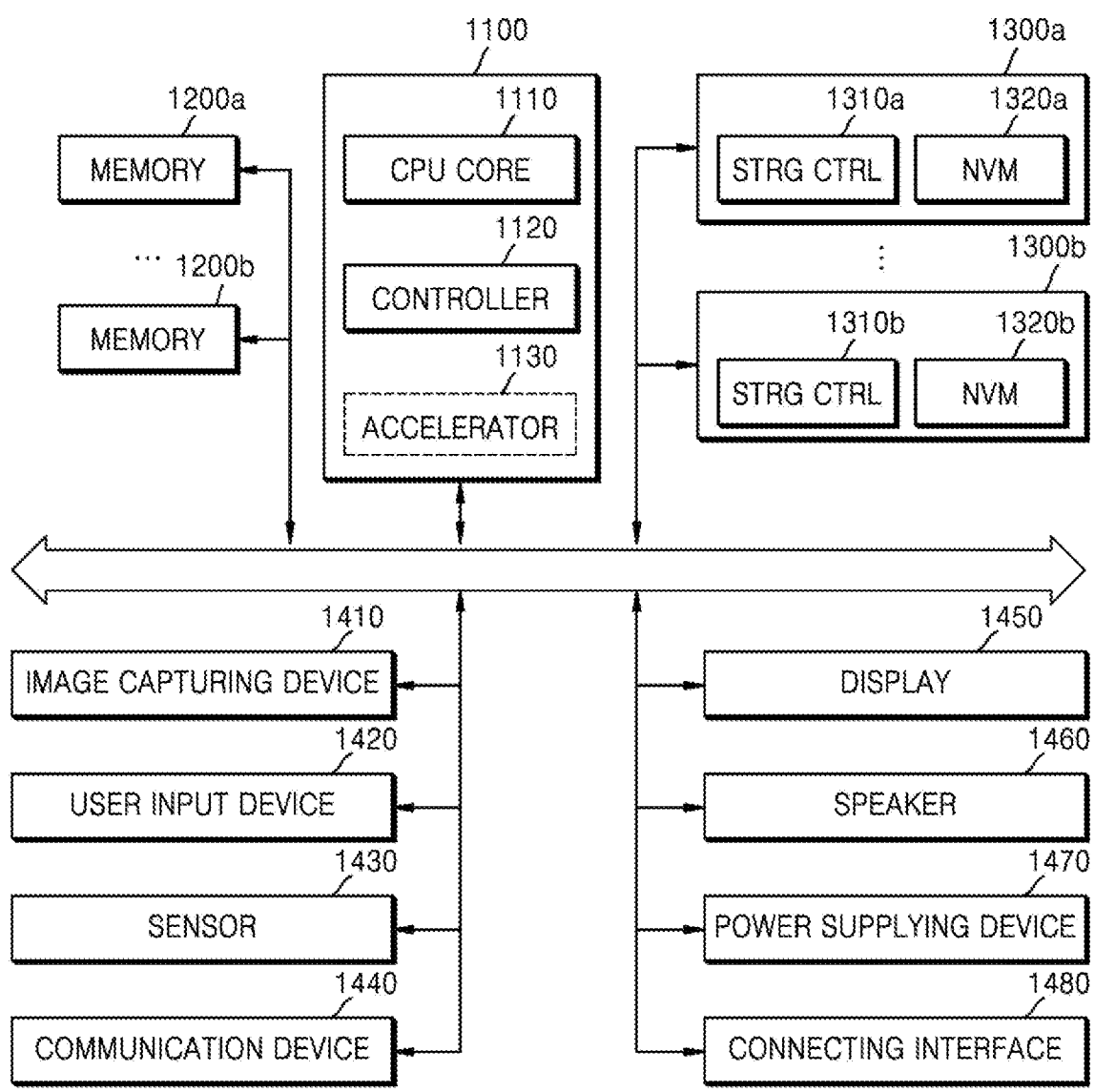
FIG. 17 is a diagram of a system 1000 to which a storage device is applied according to an exemplary embodiment of the present disclosure.

FIG. 17 is a diagram of a system 1000 to which a storage device is applied, according to an exemplary embodiment of the present disclosure.

The system 1000 of FIG. 17 may basically be a mobile system, such as a portable communication terminal (e.g., a mobile phone), a smartphone, a tablet personal computer (PC), a wearable device, a healthcare device, or an Internet of things (IOT) device. However, the system 1000 of FIG. 17 is not necessarily limited to the mobile system and may be a PC, a laptop computer, a server, a media player, or an automotive device (e.g., a navigation device).

Referring to FIG. 17, the system 1000 may include a main processor 1100, memories (e.g., 1200a and 1200b), and storage devices (e.g., 1300a and 1300b). The storage devices may be configured to perform the data access method described above. In addition, the system 1000 may include at least one of an image capturing device 1410, a user input device 1420, a sensor 1430, a communication device 1440, a display 1450, a speaker 1460, a power supplying device 1470, and a connecting interface 1480.

The main processor 1100 may control all operations of the system 1000, more specifically, operations of other components included in the system 1000. The main processor 1100 may be implemented as a general-purpose processor, a dedicated processor, or an application processor.

The main processor 1100 may include at least one CPU core 1110 and further include a controller 1120 configured to control the memories 1200a and 1200b and/or the storage devices 1300a and 1300b. In some embodiments, the main processor 1100 may further include an accelerator 1130, which is a dedicated circuit for a high-speed data operation, such as an artificial intelligence (AI) data operation. The accelerator 1130 may include a graphics processing unit (GPU), a neural processing unit (NPU) and/or a data processing unit (DPU) and be implemented as a chip that is physically separate from the other components of the main processor 1100.

The memories 1200a and 1200b may be used as main memory devices of the system 1000. Although each of the memories 1200a and 1200b may include a volatile memory, such as static random access memory (SRAM) and/or dynamic RAM (DRAM), each of the memories 1200a and 1200b may include non-volatile memory, such as a flash memory, phase-change RAM (PRAM) and/or resistive RAM (RRAM). The memories 1200a and 1200b may be implemented in the same package as the main processor 1100.

The storage devices 1300a and 1300b may serve as non-volatile storage devices configured to store data regardless of whether power is supplied thereto, and have larger storage capacity than the memories 1200a and 1200b. The storage devices 1300a and 1300b may respectively include storage controllers (STRG CTRL) 1310a and 1310b and NVM (Non-Volatile Memory)s 1320a and 1320b configured to store data via the control of the storage controllers 1310a and 1310b. Although the NVMs 1320a and 1320b may include flash memories having a two-dimensional (2D) structure or a three-dimensional (3D) V-NAND structure, the NVMs 1320a and 1320b may include other types of NVMs, such as PRAM and/or RRAM.

The storage devices 1300a and 1300b may be physically separated from the main processor 1100 and included in the system 1000 or implemented in the same package as the main processor 1100. In addition, the storage devices 1300a and 1300b may have types of solid-state devices (SSDs) or memory cards and be removably combined with other components of the system 100 through an interface, such as the connecting interface 1480 that will be described below. The storage devices 1300a and 1300b may be devices to which a standard protocol, such as a universal flash storage (UFS), an embedded multi-media card (eMMC), or a non-volatile memory express (NVMe), is applied, without being limited thereto.

The image capturing device 1410 may capture still images or moving images. The image capturing device 1410 may include a camera, a camcorder, and/or a webcam.

The user input device 1420 may receive various types of data input by a user of the system 1000 and include a touch pad, a keypad, a keyboard, a mouse, and/or a microphone.

The sensor 1430 may detect various types of physical quantities, which may be obtained from the outside of the system 1000, and convert the detected physical quantities into electric signals. The sensor 1430 may include a temperature sensor, a pressure sensor, an illuminance sensor, a position sensor, an acceleration sensor, a biosensor, and/or a gyroscope sensor.

The communication device 1440 may transmit and receive signals between other devices outside the system 1000 according to various communication protocols. The communication device 1440 may include an antenna, a transceiver, and/or a modem.

The display 1450 and the speaker 1460 may serve as output devices configured to respectively output visual information and auditory information to the user of the system 1000.

The power supplying device 1470 may appropriately convert power supplied from a battery (not shown) embedded in the system 1000 and/or an external power source, and supply the converted power to each of components of the system 1000.

The connecting interface 1480 may provide connection between the system 1000 and an external device, which is connected to the system 1000 and capable of transmitting and receiving data to and from the system 1000. The connecting interface 1480 may be implemented by using various interface schemes, such as advanced technology attachment (ATA), serial ATA (SATA), external SATA (e-SATA), small computer small interface (SCSI), serial attached SCSI (SAS), peripheral component interconnection (PCI), PCI express (PCIe), NVMe, IEEE 1394, a universal serial bus (USB) interface, a secure digital (SD) card interface, a multi-media card (MMC) interface, an eMMC interface, a UFS interface, an embedded UFS (eUFS) interface, and a compact flash (CF) card interface.

The storage device (e.g., 1300a or 1300b) may be a ZNS SSD. According to an exemplary embodiment of the disclosure, a system (e.g., 1000), to which a storage device is applied, is provided, comprising: a main processor (e.g., 1100); a memory (e.g., 1200a and 1200b); and the storage device (e.g., 1300a and 1300b), wherein the storage device is configured to perform the data access method as described above. For example, the storage controller (e.g., 1310a or 1310b) may include the ZONE Switcher 820, the ZONE Cache 830, the ZONE persistence controller 840 and NAND Chip Array 810 of FIG. 8; may include the ZONE Switcher 1620, the ZONE Cache 1630, the ZONE persistence controller 1640 and NAND Chip Array 1650 of FIG. 16; and perform any of the above-described methods or operations.

Figure 18:
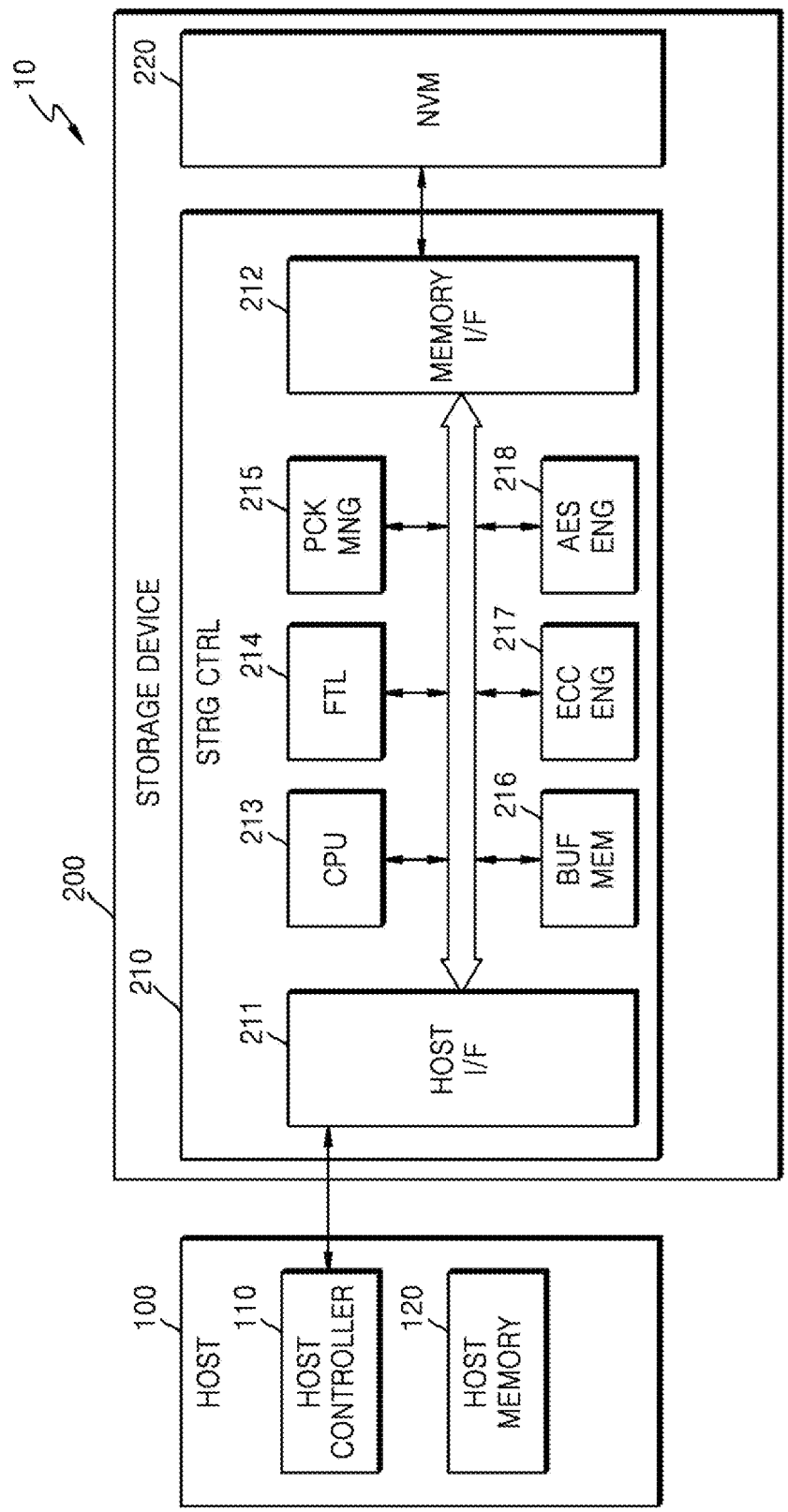
FIG. 18 is a block diagram of a host storage system 10 according to an exemplary embodiment.

FIG. 18 is a block diagram of a host storage system 10 according to an example embodiment.

The host storage system 10 may include a host 100 and a storage device 200. The storage device 200 may be configured to perform the data access method described above. Further, the storage device 200 may include a storage controller 210 and an NVM 220. According to an example embodiment, the host 100 may include a host controller 110 and a host memory 120. The host memory 120 may serve as a buffer memory configured to temporarily store data to be transmitted to the storage device 200 or data received from the storage device 200.

The storage device 200 may include storage media configured to store data in response to requests from the host 100. As an example, the storage device 200 may include at least one of an SSD, an embedded memory, and a removable external memory. When the storage device 200 is an SSD, the storage device 200 may be a device that conforms to an NVMe standard. When the storage device 200 is an embedded memory or an external memory, the storage device 200 may be a device that conforms to a UFS standard or an eMMC standard. Each of the host 100 and the storage device 200 may generate a packet according to an adopted standard protocol and transmit the packet.

When the NVM 220 of the storage device 200 includes a flash memory, the flash memory may include a 2D NAND memory array or a 3D (or vertical) NAND (VNAND) memory array. As another example, the storage device 200 may include various other kinds of NVMs. For example, the storage device 200 may include magnetic RAM (MRAM), spin-transfer torque MRAM, conductive bridging RAM (CBRAM), ferroelectric RAM (FRAM), PRAM, RRAM, and various other kinds of memories.

According to an embodiment, the host controller 110 and the host memory 120 may be implemented as separate semiconductor chips. Alternatively, in some embodiments, the host controller 110 and the host memory 120 may be integrated in the same semiconductor chip. As an example, the host controller 110 may be any one of a plurality of modules included in an application processor (AP). The AP may be implemented as a System on Chip (SoC). Further, the host memory 120 may be an embedded memory included in the AP or an NVM or memory module located outside the AP.

The host controller 110 may manage an operation of storing data (e.g., write data) of a buffer region of the host memory 120 in the NVM 220 or an operation of storing data (e.g., read data) of the NVM 220 in the buffer region.

The storage controller 210 may include a host interface 211, a memory interface 212, and a CPU 213. Further, the storage controllers 210 may further include a flash translation layer (FTL) 214, a packet manager 215, a buffer memory 216, an error correction code (ECC) engine 217, and an advanced encryption standard (AES) engine 218. The storage controllers 210 may further include a working memory (not shown) in which the FTL 214 is loaded. The CPU 213 may execute the FTL 214 to control data write and read operations on the NVM 220.

The host interface 211 may transmit and receive packets to and from the host 100. A packet transmitted from the host 100 to the host interface 211 may include a command or data to be written to the NVM 220. A packet transmitted from the host interface 211 to the host 100 may include a response to the command or data read from the NVM 220. The memory interface 212 may transmit data to be written to the NVM 220 to the NVM 220 or receive data read from the NVM 220. The memory interface 212 may be configured to comply with a standard protocol, such as Toggle or open NAND flash interface (ONFI).

The FTL 214 may perform various functions, such as an address mapping operation, a wear-leveling operation, and a garbage collection operation. The address mapping operation may be an operation of converting a logical address received from the host 100 into a physical address used to actually store data in the NVM 220. The wear-leveling operation may be a technique for preventing excessive deterioration of a specific block by allowing blocks of the NVM 220 to be uniformly used. As an example, the wear-leveling operation may be implemented using a firmware technique that balances erase counts of physical blocks. The garbage collection operation may be a technique for ensuring usable capacity in the NVM 220 by erasing an existing block after copying valid data of the existing block to a new block.

The packet manager 215 may generate a packet according to a protocol of an interface, which consents to the host 100, or parse various types of information from the packet received from the host 100. In addition, the buffer memory 216 may temporarily store data to be written to the NVM 220 or data to be read from the NVM 220. Although the buffer memory 216 may be a component included in the storage controllers 210, the buffer memory 216 may be outside the storage controllers 210.

The ECC engine 217 may perform error detection and correction operations on read data read from the NVM 220. More specifically, the ECC engine 217 may generate parity bits for write data to be written to the NVM 220, and the generated parity bits may be stored in the NVM 220 together with write data. During the reading of data from the NVM 220, the ECC engine 217 may correct an error in the read data by using the parity bits read from the NVM 220 along with the read data, and output error-corrected read data.

The AES engine 218 may perform at least one of an encryption operation and a decryption operation on data input to the storage controllers 210 by using a symmetric-key algorithm.

The storage device 200 may be a ZNS SSD. According to an exemplary embodiment of the disclosure, a host storage system (e.g., 10) is provided, comprising: a host (e.g., 100); and a storage device (200), wherein the storage device is configured to perform the data access method as described above. For example, the storage controller 210 may include the ZONE Switcher 820, the ZONE Cache 830, the ZONE persistence controller 840 and NAND Chip Array 810 of FIG. 8; may include the ZONE Switcher 1620, the ZONE Cache 1630, the ZONE persistence controller 1640 and NAND Chip Array 1650 of FIG. 16; or perform any of the above-described methods or operations.

Figure 19:
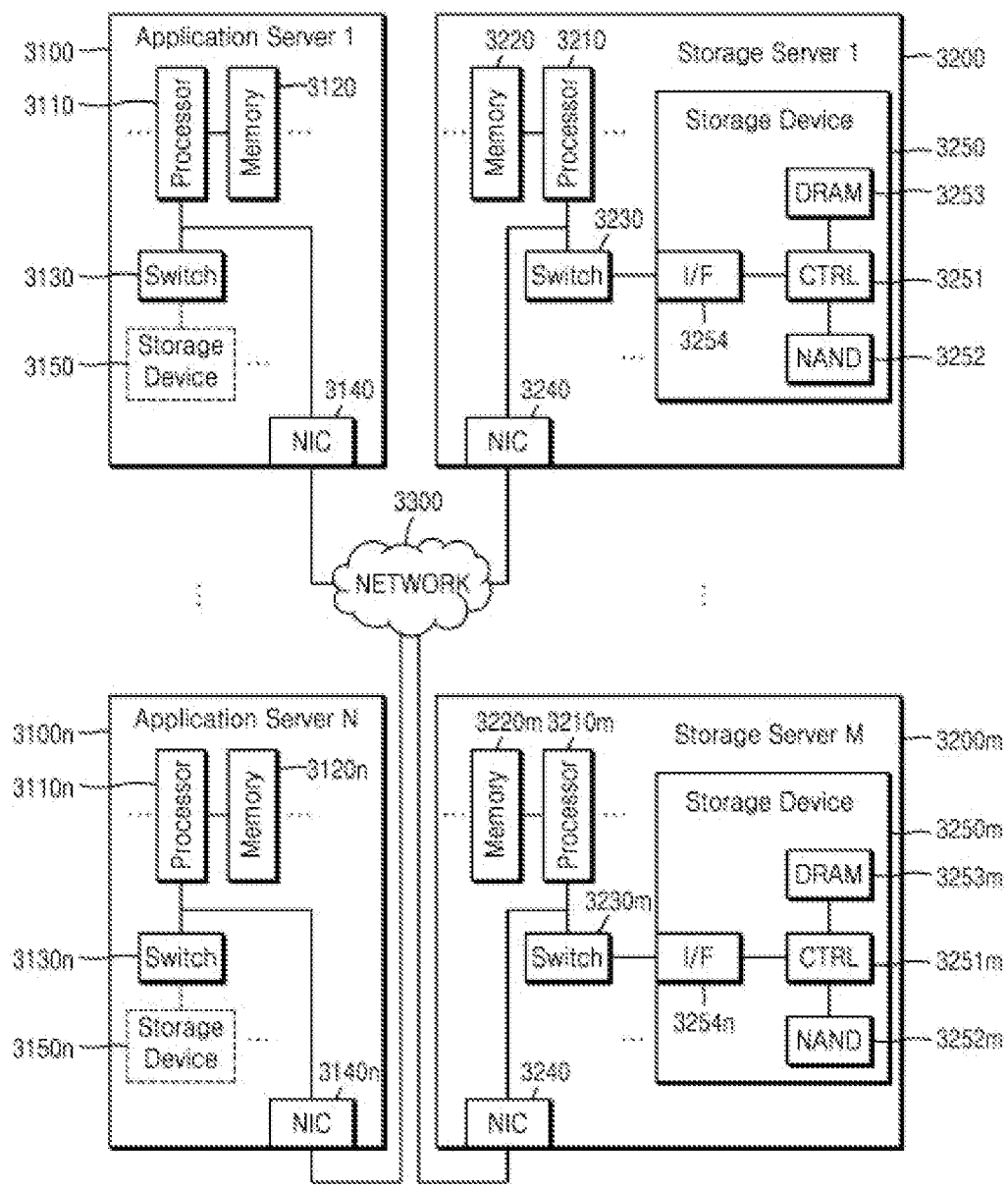
FIG. 19 is a diagram of a data center 3000 to which a memory device is applied according to an exemplary embodiment of the present disclosure.

FIG. 19 is a diagram of a data center 3000 to which a memory device is applied, according to one exemplary embodiment of the disclosure.

Platform Portion—Server (Application/Storage)

Referring to FIG. 19, the data center 3000 may be a facility that collects various types of pieces of data and provides services and be referred to as a data storage center. The data center 3000 may be a system for operating a search engine and a database, and may be a computing system used by companies, such as banks, or government agencies. The data center 3000 may include application servers 3100 to 3100n and storage servers 3200 to 3200m. The number of application servers 3100 to 3100n and the number of storage servers 3200 to 3200m may be variously selected according to embodiments. The number of application servers 3100 to 3100n may be different from the number of storage servers 3200 to 3200m.

The application server 3100 or the storage server 3200 may include at least one of processors 3110 and 3210 and memories 3120 and 3220. The storage server 3200 will now be described as an example. The processor 3210 may control all operations of the storage server 3200, access the memory 3220, and execute instructions and/or data loaded in the memory 3220. The memory 3220 may be a double-data-rate synchronous DRAM (DDR SDRAM), a high-bandwidth memory (HBM), a hybrid memory cube (HMC), a dual in-line memory module (DIMM), Optane DIMM, and/or a non-volatile DIMM (NVMDIMM). In some embodiments, the numbers of processors 3210 and memories 3220 included in the storage server 3200 may be variously selected. In an embodiment, the processor 3210 and the memory 3220 may provide a processor-memory pair. In an embodiment, the number of processors 3210 may be different from the number of memories 3220. The processor 3210 may include a single-core processor or a multi-core processor. The above description of the storage server 3200 may be similarly applied to the application server 3100. In some embodiments, the application server 3100 may not include a storage device 3150. The storage server 3200 may include at least one storage device 3250. The number of storage devices 3250 included in the storage server 3200 may be variously selected according to embodiments.

Platform Portion—Network

The application servers 3100 to 3100n may communicate with the storage servers 3200 to 3200m through a network 3300. The network 3300 may be implemented by using a fiber channel (FC) or Ethernet. In this case, the FC may be a medium used for relatively high-speed data transmission and use an optical switch with high performance and high availability. The storage servers 3200 to 3200m may be provided as file storages, block storages, or object storages according to an access method of the network 3300.

In an embodiment, the network 3300 may be a storage-dedicated network, such as a storage area network (SAN). For example, the SAN may be an FC-SAN, which uses an FC network and is implemented according to an FC protocol (FCP). As another example, the SAN may be an Internet protocol (IP)-SAN, which uses a transmission control protocol (TCP)/IP network and is implemented according to a SCSI over TCP/IP or Internet SCSI (iSCSI) protocol. In another embodiment, the network 3300 may be a general network, such as a TCP/IP network. For example, the network 3300 may be implemented according to a protocol, such as FC over Ethernet (FCoE), network attached storage (NAS), and NVMe over Fabrics (NVMe-oF).

Hereinafter, the application server 3100 and the storage server 3200 will mainly be described. A description of the application server 3100 may be applied to another application server 3100n, and a description of the storage server 3200 may be applied to another storage server 3200m.

The application server 3100 may store data, which is requested by a user or a client to be stored, in one of the storage servers 3200 to 3200m through the network 3300. Also, the application server 3100 may obtain data, which is requested by the user or the client to be read, from one of the storage servers 3200 to 3200m through the network 3300. For example, the application server 3100 may be implemented as a web server or a database management system (DBMS).

The application server 3100 may access a memory 3120n or a storage device 3150n, which is included in another application server 3100n, through the network 3300. Alternatively, the application server 3100 may access memories 3220 to 3220m or storage devices 3250 to 3250m, which are included in the storage servers 3200 to 3200m, through the network 3300. Thus, the application server 3100 may perform various operations on data stored in application servers 3100 to 3100n and/or the storage servers 3200 to 3200m. For example, the application server 3100 may execute an instruction for moving or copying data between the application servers 3100 to 3100n and/or the storage servers 3200 to 3200m. In this case, the data may be moved from the storage devices 3250 to 3250m of the storage servers 3200 to 3200m to the memories 3120 to 3120n of the application servers 3100 to 3100n directly or through the memories 3220 to 3220m of the storage servers 3200 to 3200m. The data moved through the network 3300 may be data encrypted for security or privacy.

Organic Relationship—Interface Structure/Type

The storage server 3200 will now be described as an example. An interface 3254 may provide physical connection between a processor 3210 and a controller 3251 and a physical connection between a network interface card (NIC) 3240 and the controller 3251. For example, the interface 3254 may be implemented using a direct attached storage (DAS) scheme in which the storage device 3250 is directly connected with a dedicated cable. For example, the interface 3254 may be implemented by using various interface schemes, such as ATA, SATA, e-SATA, an SCSI, SAS, PCI, PCIe, NVMe, IEEE 1394, a USB interface, an SD card interface, an MMC interface, an eMMC interface, a UFS interface, an eUFS interface, and/or a CF card interface.

The storage server 3200 may further include a switch 3230 and the NIC(Network InterConnect) 3240. The switch 3230 may selectively connect the processor 3210 to the storage device 3250 or selectively connect the NIC 3240 to the storage device 3250 via the control of the processor 3210.

In an embodiment, the NIC 3240 may include a network interface card and a network adaptor. The NIC 3240 may be connected to the network 3300 by a wired interface, a wireless interface, a Bluetooth interface, or an optical interface. The NIC 3240 may include an internal memory, a digital signal processor (DSP), and a host bus interface and be connected to the processor 3210 and/or the switch 3230 through the host bus interface. The host bus interface may be implemented as one of the above-described examples of the interface 3254. In an embodiment, the NIC 3240 may be integrated with at least one of the processor 3210, the switch 3230, and the storage device 3250.

Organic Relationship—Interface Operation

In the storage servers 3200 to 3200m or the application servers 3100 to 3100n, a processor may transmit a command to storage devices 3150 to 3150n and 3250 to 3250m or the memories 3120 to 3120n and 3220 to 3220m and program or read data. In this case, the data may be data of which an error is corrected by an ECC engine. The data may be data on which a data bus inversion (DBI) operation or a data masking (DM) operation is performed, and may include cyclic redundancy code (CRC) information. The data may be data encrypted for security or privacy.

Storage devices 3150 to 3150n and 3250 to 3250m may transmit a control signal and a command/address signal to NAND flash memory devices 3252 to 3252m in response to a read command received from the processor. Thus, when data is read from the NAND flash memory devices 3252 to 3252m, a read enable (RE) signal may be input as a data output control signal, and thus, the data may be output to a DQ bus. A data strobe signal DQS may be generated using the RE signal. The command and the address signal may be latched in a page buffer depending on a rising edge or falling edge of a write enable (WE) signal.

Product Portion—SSD Basic Operation

The controller 3251 may control all operations of the storage device 3250. In an embodiment, the controller 3251 may include SRAM. The controller 3251 may write data to the NAND flash memory device 3252 in response to a write command or read data from the NAND flash memory device 3252 in response to a read command. For example, the write command and/or the read command may be provided from the processor 3210 of the storage server 3200, the processor 3210m of another storage server 3200m, or the processors 3110 and 3110n of the application servers 3100 and 3100n. DRAM 3253 may temporarily store (or buffer) data to be written to the NAND flash memory device 3252 or data read from the NAND flash memory device 3252. Also, the DRAM 3253 may store metadata. Here, the metadata may be user data or data generated by the controller 3251 to manage the NAND flash memory device 3252. The storage device 3250 may include a secure element (SE) for security or privacy.

The storage device 3250 may be a ZNS SSD. According to an exemplary embodiment of the disclosure, a data center system (e.g., 3000) is provided, comprising: a plurality of application servers (3100 to 3100n); and a plurality of storage servers (e.g., 3200 to 3200m), wherein each storage server includes a storage device 200, wherein the storage device 3251 is configured to perform the data access method as described above. For example, the controller 3251 may include the ZONE Switcher 820, the ZONE Cache 830, the ZONE persistence controller 840 and NAND Chip Array 810 of FIG. 8; may include the ZONE Switcher 1620, the ZONE Cache 1630, the ZONE persistence controller 1640 and NAND Chip Array 1650 of FIG. 16; or perform any of the above-described methods or operations.

According to an exemplary embodiment of the disclosure, a computer readable storage medium having a computer program stored thereon is provided, wherein the data access method as described above is implemented when the computer program is executed by a processor.

According to an exemplary embodiment of the disclosure, an electronic apparatus is provided, comprising: a processor; a memory storing a computer program, wherein the computer program when executed by the processor implements the data access method as described above.

According to an exemplary embodiment of the disclosure, a computer-readable storage medium storing instructions may also be provided, the instructions, when executed by at least one processor, cause the at least one processor to perform the data access method a data access method according to embodiments of the disclosure. Examples of computer-readable storage media herein include: read-only memory (ROM), random access programmable read-only memory (PROM), electrically erasable programmable read-only memory (EEPROM), random access memory (RAM), dynamic random access memory (DRAM), static random access memory (SRAM), flash memory, non-volatile memory, CD-ROM, CD-R, CD+R, CD-RW, CD+RW, DVD-ROM, DVD-R, DVD+R, DVD-RW, DVD+RW, DVD-RAM, BD-ROM, BD-R, BD-R LTH, BD-RE, Blu-ray or optical disk memory, hard disk drive (HDD), solid state drive (SSD), card-based memory (such as, multimedia cards, Secure Digital (SD) cards and/or Extreme Digital (XD) cards), magnetic tapes, floppy disks, magneto-optical data storage devices, optical data storage devices, hard disks, solid state disks, and/or any other device, where the other device is configured to store the computer programs and any associated data, data files, and/or data structures in a non-transitory manner and to provide the computer programs and any associated data, data files, and/or data structures to a processor or computer, so that the processor or computer may execute the computer program. The computer program in the computer readable storage medium may run in an environment deployed in a computer device such as a terminal, client, host, agent, server, etc., and furthermore, in one example, the computer program and any associated data, data files and data structures are distributed on a networked computer system such that the computer program and any associated data, data files and data structures are stored, accessed, and/or executed in a distributed manner by one or more processors or computers.

While the inventive concept has been particularly shown and described with reference to embodiments thereof, it will be understood that various changes in form and details may be made therein without departing from the spirit and scope of the following claims.

What is claimed is:

1. A storage device configured to store kernel data of a kernel, the storage device comprising:
   a NAND chip array including a plurality of NAND chips;
   a ZONE cache configured to cache write data in a cache space corresponding to a ZONE among a plurality ZONES;
   a first control circuit configured to receive the kernel data arranged in a first order, where the kernel previously generated the kernel data from application data of an application arranged in a second order different from the first order, and the first control circuit caches the kernel data in the ZONE cache in the second order, based on a ZONE write command being received; and
   a second control circuit configured to control storing, in parallel, the write data in at least two of the plurality of ZONES cached in the ZONE cache in the NAND chips corresponding to the plurality of ZONES.

2. The storage device of claim 1, wherein the first control circuit is configured to control writing of the kernel data to the cache space corresponding to the ZONE in the ZONE cache according to a first write operation request order, wherein the first write operation request order is different from a second write operation request order of the application.

3. The storage device of claim 1, wherein the first control circuit is further configured to:
   allocate the cache space corresponding to the ZONE in the ZONE cache when a ZONE open command is received; and
   inform the second control circuit about a plurality of closed ZONES when at least one ZONE close command is received.

4. The storage device of claim 3, wherein the second control circuit is configured to:
   map each of the plurality of closed ZONES to the NAND chips in the NAND chip array and control storing, in parallel, the write data in the plurality of ZONES cached in the ZONE cache in the NAND chips to which each of the ZONES is mapped, according to a current idle state of the NAND chip array.

5. The storage device of claim 4, wherein the second control circuit is further configured to: set a state of the each of the ZONES to a first state after storing the write data in the plurality of ZONES in parallel in the NAND chips to which each of the ZONES is mapped.

6. The storage device of claim 5, wherein the first control circuit is further configured to: set a state of the ZONE to a second state after the kernel data is cached in the cache space corresponding to the ZONE.

7. The storage device of claim 1, wherein the first control circuit is further configured to:
   determine whether read data to be read is stored in the ZONE cache or in the NAND chip array in response to receiving a ZONE read command;
   read the read data from the ZONE cache when it is determined that the read data to be read is stored in the ZONE cache; and
   read the read data from the NAND chip array when it is determined that the read data to be read is stored in the NAND chip array.

8. The storage device of claim 7, wherein the first control circuit is configured to determine, when the ZONE read command is received, whether the read data to be read is stored in the ZONE cache or in the NAND chip array according to a state of the ZONE in which the read data to be read is located,
   wherein if the state of the ZONE in which the read data to be read is located is a first state, the read data is read from NAND chips in the NAND chip array corresponding to the ZONE in which the read data to be read is located; and
   wherein if the state of the ZONE in which the read data to be read is located is a second state, the read data is read from a cache space in the ZONE cache corresponding to the ZONE in which the read data to be read is located.

9. A data access method to store kernel data of a kernel in a storage device, wherein the storage device comprises a NAND chip array, a first control circuit, a ZONE cache, and a second control circuit, the data access method comprising:
   receiving, by the first control circuit, the kernel data arranged in a first order, where the kernel previously generated the kernel data from application data of an application arranged in a second order different from the first order;
   caching, by the first control circuit, the kernel data in the ZONE cache in the second order, based on a ZONE write command being received; and
   controlling, by the second control circuit, storing, in parallel, write data in a plurality of ZONES cached in the ZONE cache in NAND chips of the NAND chip array corresponding to the plurality of ZONES.

10. The data access method of claim 9, wherein the caching by the first control circuit comprises: controlling writing of the kernel data to a cache space corresponding to a ZONE among the ZONES in the ZONE cache in a first write operation request order, wherein the first write operation request order is different from a second write operation request order of an application to the ZONE.

11. The data access method of claim 9, further comprising:
   allocating, by the first control circuit, a cache space corresponding to a ZONE among the ZONES in the ZONE cache when a ZONE open command is received; and
   the first control circuit informing the second control circuit about a plurality of closed ZONES when at least one ZONE close command is received.

12. The data access method of claim 11, wherein the controlling, by the second control circuit comprises:
   the second control circuit mapping each of the plurality of closed ZONES to the NAND chips in the NAND chip array and controlling storing, in parallel, the write data in the plurality of ZONES cached in the ZONE cache in the NAND chips to which each of the ZONES is mapped, according to a current idle state of the NAND chip array.

13. The data access method of claim 12, further comprising: the second control circuit setting a state of the each of the ZONES to a first state after storing the write data in the plurality of ZONES in parallel in the NAND chips to which each of the ZONES is mapped.

14. The data access method of claim 13, further comprising: the first control circuit setting a state of the ZONE to a second state after the write data is cached in the cache space corresponding to the ZONE.

15. The data access method of claim 9, further comprising:
   the first control circuit determining whether read data to be read is stored in the ZONE cache or in the NAND chip array when a ZONE read command is received;
   the first control circuit reading the read data from the ZONE cache when it is determined that the read data to be read is stored in the ZONE cache; and
   the first control circuit reading the read data from the NAND chip array when it is determined that the read data to be read is stored in the NAND chip array.

16. The data access method of claim 15, wherein the first control circuit determining whether the read data to be read is stored in the ZONE cache or in the NAND chip array when a ZONE read command is received, comprises:
   determining, when the ZONE read command is received, whether the read data to be read is stored in the ZONE cache or in the NAND chip array according to a state of the ZONE in which the read data to be read is located,
   reading the read data from NAND chips in the NAND chip array corresponding to the ZONE in which the read data to be read is located when it is determined the state of the ZONE in which the read data to be read is located is a first state; and
   reading the read data from a cache space in the ZONE cache corresponding to the ZONE in which the read data to be read is located when it is determined the state of the ZONE in which the read data to be read is located is a second state.

17. A Zoned Name Space (ZNS) storage device, comprising:
   a memory comprising a plurality of zones;
   a cache associated with the plurality of zones; and
   a controller configured to:
      receive data in a first order and a ZONE write command to write the data to a first zone among the plurality of zones of the memory,
      identify offset addresses associated with portions of the data,
      cache the data in the cache in a second order based on the offset addresses, and
      write the data from the cache to the first zone of the memory.

18. The ZNS storage device of claim 17, wherein the memory is a NAND chip array including a plurality of NAND chips.

19. The ZNS storage device of claim 17, wherein the controller writes the data arranged in the second order from the cache to the first zone during an asynchronous input-output (IO) mode.

20. The ZNS storage device of claim 17, wherein the controller writes the data arranged in the second order from the cache to the first zone in sequential order during a synchronous IO mode.

* * * * *